(12) United States Patent
Choi et al.

(10) Patent No.: US 12,219,132 B2
(45) Date of Patent: Feb. 4, 2025

(54) IMAGE ENCODING/DECODING METHOD AND DEVICE FOR UTILIZING SIMPLIFIED MPM LIST GENERATION METHOD, AND METHOD FOR TRANSMITTING BITSTREAM

(71) Applicant: LG ELECTRONICS INC., Seoul (KR)

(72) Inventors: Jangwon Choi, Seoul (KR); Jin Heo, Seoul (KR); Sunmi Yoo, Seoul (KR); Jungah Choi, Seoul (KR); Seung Hwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/525,025

(22) Filed: Nov. 30, 2023

(65) Prior Publication Data

US 2024/0129460 A1    Apr. 18, 2024

Related U.S. Application Data

(63) Continuation of application No. 17/987,732, filed on Nov. 15, 2022, now Pat. No. 11,889,069, which is a
(Continued)

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/136* (2014.11);
(Continued)

(58) Field of Classification Search
None
See application file for complete search history.

(56) References Cited

U.S. PATENT DOCUMENTS

2024/0314303 A1*   9/2024   Ma ........................ H04N 19/11

FOREIGN PATENT DOCUMENTS

| CN | 109792521 A | 5/2019 |
|----|-------------|--------|
| KR | 20110050914 A | 5/2011 |

OTHER PUBLICATIONS

Bross et al. "Versatile Video Coding (Draft 5)," ITU-T SG 16 WP 3 and ISO/IEC JTC 1/SC 29/WG 11, JVET-N1001-v6v7, 384 pages, Mar. 2019.
(Continued)

*Primary Examiner* — Christopher G Findley
(74) *Attorney, Agent, or Firm* — Bryan Cave Leighton Paisner LLP

(57) ABSTRACT

An image encoding/decoding method and apparatus are provided. An image decoding method performed by an image decoding apparatus may include identifying a prediction mode of a current block, determining a candidate intra prediction mode for the current block, based on a prediction mode of a neighboring block located around the current block, based on the intra prediction mode of the current block being an intra prediction mode, generating a candidate intra prediction mode list of the current block based on the candidate intra prediction mode, and determine an intra prediction mode of the current block based on the candidate intra prediction mode list. In this case, the candidate intra prediction mode may be determined to be a predetermined intra prediction mode, based on the prediction mode of the neighboring block being an MIP mode.

11 Claims, 21 Drawing Sheets

Related U.S. Application Data continuation of application No. 17/547,835, filed on Dec. 10, 2021, now Pat. No. 11,533,479, which is a continuation of application No. PCT/KR2020/007727, filed on Jun. 15, 2020.

(60) Provisional application No. 62/861,291, filed on Jun. 13, 2019, provisional application No. 62/861,286, filed on Jun. 13, 2019.

(51) Int. Cl.
  *H04N 19/136* (2014.01)
  *H04N 19/159* (2014.01)
  *H04N 19/176* (2014.01)
  *H04N 19/186* (2014.01)

(52) U.S. Cl.
  CPC ......... *H04N 19/159* (2014.11); *H04N 19/176* (2014.11); *H04N 19/186* (2014.11)

(56) References Cited

OTHER PUBLICATIONS

Salehifar et al. "CE3 Related: No MPM Derivation for Matrix Based Intra Prediction (Mip)," ITU-T SG 16 WP 3 and ISO/IEC JTC 1/SC 29/WG 11, JVET-O0169-V2, 4 pages, Jul. 2019.

* cited by examiner

FIG. 7

| MIP IntraPredMode[ xNbX ][ yNbX ] | block size type MipSizeId | | |
|---|---|---|---|
| | 0 | 1 | 2 |
| 0 | 0 | 0 | 1 |
| 1 | 18 | 1 | 1 |
| 2 | 18 | 0 | 1 |
| 3 | 0 | 1 | 1 |
| 4 | 18 | 0 | 18 |
| 5 | 0 | 22 | 0 |
| 6 | 12 | 18 | 1 |
| 7 | 0 | 18 | 0 |
| 8 | 18 | 1 | 1 |
| 9 | 2 | 0 | 50 |
| 10 | 18 | 1 | 0 |
| 11 | 12 | 0 | |
| 12 | 18 | 1 | |
| 13 | 18 | 0 | |
| 14 | 1 | 44 | |
| 15 | 18 | 0 | |
| 16 | 18 | 50 | |
| 17 | 0 | 1 | |
| 18 | 0 | 0 | |
| 19 | 50 | | |
| 20 | 0 | | |
| 21 | 50 | | |
| 22 | 0 | | |
| 23 | 56 | | |
| 24 | 0 | | |
| 25 | 50 | | |
| 26 | 66 | | |
| 27 | 50 | | |
| 28 | 56 | | |
| 29 | 50 | | |
| 30 | 50 | | |
| 31 | 1 | | |
| 32 | 50 | | |
| 33 | 50 | | |
| 34 | 50 | | |

FIG. 10

| coding_unit( x0, y0, cbWidth, cbHeight, treeType ) { | Descriptor |
|---|---|
| if( slice_type != I \|\| sps_ibc_enabled_flag ) { | |
|   if( treeType != DUAL_TREE_CHROMA &&<br>    !( cbWidth = = 4 && cbHeight = = 4 && !sps_ibc_enabled_flag ) ) | |
|     cu_skip_flag[ x0 ][ y0 ] | ae(v) |
|   if( cu_skip_flag[ x0 ][ y0 ] = = 0 && slice_type != I<br>    && !( cbWidth = = 4 && cbHeight = = 4 ) ) | |
|     pred_mode_flag | ae(v) |
|   if( ( ( slice_type = = I && cu_skip_flag[ x0 ][ y0 ] = =0 ) \|\|<br>    ( slice_type != I && ( CuPredMode[ x0 ][ y0 ] != MODE_INTRA \|\|<br>    ( cbWidth = = 4 && cbHeight = = 4 && cu_skip_flag[ x0 ][ y0 ] = = 0 ) ) ) ) &&<br>    sps_ibc_enabled_flag && ( cbWidth != 128 \|\| cbHeight != 128 ) ) | |
|     pred_mode_ibc_flag | ae(v) |
| } | |
| if( CuPredMode[ x0 ][ y0 ] = = MODE_INTRA ) { | |
|   if( sps_pcm_enabled_flag &&<br>    cbWidth >= MinIpcmCbSizeY && cbWidth <= MaxIpcmCbSizeY &&<br>    cbHeight >= MinIpcmCbSizeY && cbHeight <= MaxIpcmCbSizeY ) | |
|     pcm_flag[ x0 ][ y0 ] | ae(v) |
|   if( pcm_flag[ x0 ][ y0 ] ) { | |
|     while( !byte_aligned( ) ) | |
|       pcm_alignment_zero_bit | f(1) |
|     pcm_sample( cbWidth, cbHeight, treeType) | |

FIG. 11

| } else { | |
|---|---|
|   if( treeType = = SINGLE_TREE \|\| treeType = = DUAL_TREE_LUMA ) { | |
|     if( cbWidth <= 32 && cbHeight <= 32 ) | |
|       intra_bdpcm_flag[ x0 ][ y0 ] | ae(v) |
|     if( intra_bdpcm_flag[ x0 ][ y0 ] ) | |
|       intra_bdpcm_dir_flag[ x0 ][ y0 ] | ae(v) |
|     else { | |
|       if( sps_mip_enabled_flag &&<br>        ( Abs( Log2( cbWidth ) − Log2( cbHeight ) ) <= 2 ) &&<br>        cbWidth <= MaxTbSizeY && cbHeight <= MaxTbSizeY ) | |
|       intra_mip_flag[ x0 ][ y0 ] | ae(v) |
|       if( intra_mip_flag[ x0 ][ y0 ] ) { | |
|         intra_mip_mpm_flag[ x0 ][ y0 ] | ae(v) |
|         if( intra_mip_mpm_flag[ x0 ][ y0 ] ) | |
|           intra_mip_mpm_idx[ x0 ][ y0 ] | ae(v) |
|         else | |
|           intra_mip_mpm_remainder[ x0 ][ y0 ] | ae(v) |
|       } else { | |
|         if( sps_mrl_enabled_flag && ( ( y0 % CtbSizeY ) > 0 ) ) | |
|           intra_luma_ref_idx[ x0 ][ y0 ] | ae(v) |

FIG. 12

| | | |
|---|---|---|
| | if ( sps_isp_enabled_flag && intra_luma_ref_idx[ x0 ][ y0 ] == 0 && <br>  ( cbWidth <= MaxTbSizeY && cbHeight <= MaxTbSizeY ) && <br>  ( cbWidth * cbHeight > MinTbSizeY * MinTbSizeY ) ) | |
| | intra_subpartitions_mode_flag[ x0 ][ y0 ] | ae(v) |
| | if( intra_subpartitions_mode_flag[ x0 ][ y0 ] == 1 && <br>  cbWidth <= MaxTbSizeY && cbHeight <= MaxTbSizeY ) | |
| | intra_subpartitions_split_flag[ x0 ][ y0 ] | ae(v) |
| | if( intra_luma_ref_idx[ x0 ][ y0 ] == 0 && <br>  intra_subpartitions_mode_flag[ x0 ][ y0 ] == 0 ) | |
| | intra_luma_mpm_flag[ x0 ][ y0 ] | ae(v) |
| | if( intra_luma_mpm_flag[ x0 ][ y0 ] ) { | |
| | if( intra_luma_ref_idx[ x0 ][ y0 ] == 0 ) | |
| | intra_luma_not_planar_flag[ x0 ][ y0 ] | ae(v) |
| | if( intra_luma_not_planar_flag[ x0 ][ y0 ] ) | |
| | intra_luma_mpm_idx[ x0 ][ y0 ] | ae(v) |
| | } else | |
| | intra_luma_mpm_remainder[ x0 ][ y0 ] | ae(v) |
| | } | |
| | } | |
| | } | |

FIG. 13

| IntraPredModeY[ xNbX ][ yNbX ] | block size type MipSizeId | | |
|---|---|---|---|
| | 0 | 1 | 2 |
| 0 | 17 | 0 | 5 |
| 1 | 17 | 0 | 1 |
| 2, 3 | 17 | 10 | 3 |
| 4, 5 | 9 | 10 | 3 |
| 6, 7 | 9 | 10 | 3 |
| 8, 9 | 9 | 10 | 3 |
| 10, 11 | 9 | 10 | 0 |
| 12, 13 | 17 | 4 | 0 |
| 14, 15 | 17 | 6 | 0 |
| 16, 17 | 17 | 7 | 4 |
| 18, 19 | 17 | 7 | 4 |
| 20, 21 | 17 | 7 | 4 |
| 22, 23 | 17 | 5 | 5 |
| 24, 25 | 17 | 5 | 1 |
| 26, 27 | 5 | 0 | 1 |
| 28, 29 | 5 | 0 | 1 |
| 30, 31 | 5 | 3 | 1 |
| 32, 33 | 5 | 3 | 1 |
| 34, 35 | 34 | 12 | 6 |
| 36, 37 | 22 | 12 | 6 |
| 38, 39 | 22 | 12 | 6 |
| 40, 41 | 22 | 12 | 6 |
| 42, 43 | 22 | 14 | 6 |
| 44, 45 | 34 | 14 | 10 |
| 46, 47 | 34 | 14 | 10 |
| 48, 49 | 34 | 16 | 9 |
| 50, 51 | 34 | 16 | 9 |
| 52, 53 | 34 | 16 | 9 |
| 54, 55 | 34 | 15 | 9 |
| 56, 57 | 34 | 13 | 9 |
| 58, 59 | 26 | 1 | 8 |
| 60, 61 | 26 | 1 | 8 |
| 62, 63 | 26 | 1 | 8 |
| 64, 65 | 26 | 1 | 8 |
| 66 | 26 | 1 | 8 |

| Candidate | block size type MipSizeId | | |
|---|---|---|---|
| | 0 | 1 | 2 |
| FIRST CANDIDATE INTRA PREDICTION MODE (candMipModeList[ 0 ]) | 17 | 34 | 5 |
| SECOND CANDIDATE INTRA PREDICTION MODE (candMipModeList[ 1 ]) | 0 | 7 | 16 |
| THIRD CANDIDATE INTRA PREDICTION MODE (candMipModeList[ 2 ]) | 1 | 4 | 6 |

| | All Intra Main1 0 | | | | |
|---|---|---|---|---|---|
| | Over VTM-5.0 | | | | |
| | Y | U | V | EncT | DecT |
| Class A1 | -0.01% | 0.06% | 0.04% | 99% | 100% |
| Class A2 | 0.03% | 0.02% | -0.02% | 99% | 100% |
| Class B | 0.01% | -0.04% | 0.09% | 99% | 98% |
| Class C | 0.00% | -0.12% | 0.05% | 100% | 99% |
| Class E | 0.03% | 0.01% | 0.03% | 98% | 96% |
| Overall | 0.01% | -0.02% | 0.04% | 99% | 98% |
| Class D | -0.03% | 0.19% | 0.00% | 99% | 87% |

|  | All Intra Main 10 | | | | |
|---|---|---|---|---|---|
|  | Over VTM-5.0 | | | | |
|  | Y | U | V | EncT | DecT |
| Class A1 | 0.01% | 0.01% | 0.03% | 98% | 99% |
| Class A2 | 0.00% | -0.01% | -0.02% | 98% | 97% |
| Class B | 0.01% | -0.04% | -0.01% | 98% | 98% |
| Class C | 0.01% | -0.09% | -0.11% | 99% | 98% |
| Class E | 0.00% | -0.04% | 0.10% | 99% | 98% |
| Overall | 0.00% | -0.04% | -0.01% | 99% | 98% |
| Class D | 0.00% | 0.14% | -0.03% | 99% | 98% |
| Class F | -0.01% | 0.00% | 0.05% | 99% | 97% |
| Class SCC | 0.01% | 0.00% | -0.02% | 100% | 99% |

|  | All Intra Main10 | | | | |
|---|---|---|---|---|---|
|  | Over VTM-5.0 | | | | |
|  | Y | U | V | EncT | DecT |
| Class A1 | 0.00% | 0.02% | -0.02% | 100% | 100% |
| Class A2 | 0.00% | 0.03% | -0.02% | 99% | 100% |
| Class B | 0.01% | -0.04% | 0.05% | 99% | 99% |
| Class C | 0.00% | -0.02% | 0.05% | 100% | 98% |
| Class E | 0.00% | -0.03% | 0.05% | 97% | 97% |
| Overall | 0.00% | -0.01% | 0.03% | 99% | 99% |
| Class D | -0.01% | 0.18% | -0.05% | 100% | 87% | ns # IMAGE ENCODING/DECODING METHOD AND DEVICE FOR UTILIZING SIMPLIFIED MPM LIST GENERATION METHOD, AND METHOD FOR TRANSMITTING BITSTREAM

This application is a Continuation Application of U.S. patent application Ser. No. 17/987,732, filed Nov. 15, 2022, which is a Continuation Application of U.S. patent application Ser. No. 17/547,835, filed Dec. 10, 2021 (now U.S. Pat. No. 11,533,479, issued on Dec. 20, 2022), which is a Continuation Bypass of International Application No. PCT/KR2020/007727 filed on Jun. 15, 2020, and claims the benefit of U.S. Provisional Application No. 62/861,286, filed on Jun. 13, 2019, and U.S. Provisional Application No. 62/861,291, filed on Jun. 13, 2019, all of which are hereby incorporated by reference in their entirety for all purposes as if fully set forth herein.

TECHNICAL FIELD

The present disclosure relates to an image encoding/decoding method and apparatus and, more particularly, to an image encoding/decoding method and apparatus for signaling an intra prediction mode and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus capable of lowering prediction complexity by mapping an intra prediction mode of a neighboring block to a predetermined prediction mode.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may include identifying a prediction mode of a current block, identifying whether an intra prediction mode of the current block is an MIP (matrix-based intra prediction) mode, based on the prediction mode of the current block being an intra prediction mode, determining a candidate intra prediction mode for the current block, based on a prediction mode of a neighboring block located around the current block, based on the intra prediction mode of the current block being not an MIP mode, generating a candidate intra prediction mode list of the current block based on the candidate intra prediction mode; and determining the intra prediction mode of the current block based on the candidate intra prediction mode list. The candidate intra prediction mode may be determined to be a predetermined intra prediction mode, based on the prediction mode of the neighboring block being an MIP mode. The predetermined intra prediction mode may be any one of a planar mode, a DC mode, a horizontal mode and a vertical mode Whether the prediction mode of the neighboring block is an MIP mode may be determined based on an MIP mode indicator for the neighboring block, and the MIP mode indicator may be obtained from a bitstream.

The candidate intra prediction mode list may be generated based on a first candidate intra prediction mode and a second candidate intra prediction mode, the first candidate intra prediction mode may be determined based on a prediction mode of a first neighboring block located around the current block, and the second candidate intra prediction mode may be determined based on a prediction mode of a second neighboring block located around the current block.

Based on the first candidate intra prediction mode and the second candidate intra prediction mode being the same and the first candidate intra prediction mode being an intra prediction mode having a greater value than a prediction mode value specifying a DC mode, the candidate intra prediction mode list may be determined to include the value of the first candidate intra prediction mode.

The candidate intra prediction mode list may be determined to have a predetermined candidate intra prediction mode, based on both the prediction mode of the first neighboring block and the prediction mode of the second neighboring block being an MIP mode.

The predetermined candidate intra prediction mode may include at least one of a DC mode or a vertical mode.

Based on the prediction mode of the first neighboring block being an MIP mode, the first candidate intra prediction mode and the second candidate intra prediction mode being different from each other and the second candidate intra prediction mode being an intra prediction mode having a greater value than a prediction mode value specifying a DC mode, the candidate intra prediction mode list may be determined to include the second candidate intra prediction mode.

The determining the intra prediction mode of the current block based on the candidate intra prediction mode list may be performed by determining any one of candidate intra prediction modes included in the candidate intra prediction mode list to be an intra prediction mode of the current block based on an intra prediction mode indicator obtained from a bitstream.

The image decoding method may include determining a reference mode for determining an intra prediction mode of a chroma block corresponding to the current block and determining the intra prediction mode of the chroma block based on the reference mode. In this case, the current block may be a luma block, and the reference mode may be determined to be a planar mode based on the intra prediction mode of the current block being an MIP mode.

The intra prediction mode of the chroma block may be determined to be the reference mode.

The reference mode may be determined based on the intra prediction mode of the current block, based on the intra prediction mode of the current block being not an MIP mode.

An image decoding apparatus according to an aspect of the present disclosure may include a memory and at least one processor. The at least one processor may identify a prediction mode of a current block, determine a candidate intra prediction mode for the current block, based on a prediction mode of a neighboring block located around the current block, based on the prediction mode of the current block being an intra prediction mode, generate a candidate intra prediction mode list of the current block based on the candidate intra prediction mode, and determine an intra prediction mode of the current block based on the candidate intra prediction mode list. The candidate intra prediction mode may be determined to be a predetermined intra prediction mode, based on the prediction mode of the neighboring block being an MIP mode.

An image encoding method performed by an image encoding apparatus according to an aspect of the present disclosure may include identifying a prediction mode of a current block, determining a candidate intra prediction mode, based on a prediction mode of a neighboring block located around the current block, based on the prediction mode of the current block being an intra prediction mode, generating a candidate intra prediction mode list of the current block based on the candidate intra prediction mode, and encoding an intra prediction mode indicator specifying an intra prediction mode of the current block based on the candidate intra prediction mode list. The candidate intra prediction mode may be determined to be a predetermined intra prediction mode, based on the prediction mode of the neighboring block being an MIP mode.

The predetermined intra prediction mode may be any one of a planar mode, a DC mode, a horizontal mode and a vertical mode The candidate intra prediction mode list may be generated based on a first candidate intra prediction mode and a second candidate intra prediction mode, the first candidate intra prediction mode may be determined based on a prediction mode of a first neighboring block located around the current block, and the second candidate intra prediction mode may be determined based on a prediction mode of a second neighboring block located around the current block. The candidate intra prediction mode list may be determined to have a predetermined candidate intra prediction mode, based on both the prediction mode of the first neighboring block and the prediction mode of the second neighboring block being an MIP mode.

The predetermined candidate intra prediction mode may include at least one of a DC mode or a vertical mode.

In addition, a transmission method according to another aspect of the present disclosure may transmit a bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus capable of lowering prediction complexity by mapping an intra prediction mode of a neighboring block to a predetermined prediction mode.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 7 is a view illustrating a mapping table for mapping an MIP mode according to an embodiment to a normal intra prediction mode.

FIGS. 10 to 12 are views illustrating syntax of a coding unit according to an embodiment.

FIG. 13 is a view illustrating a mapping table for mapping a normal intra prediction mode according to an embodiment to an MIP mode.

MODE FOR INVENTION

Figure 1:
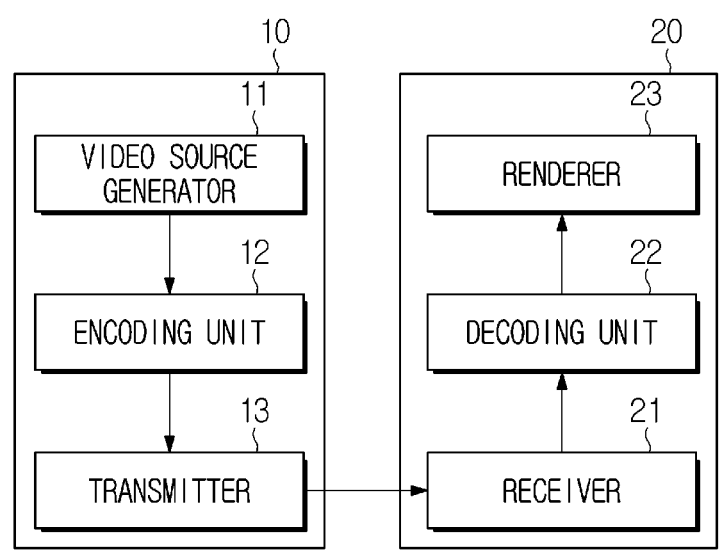
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
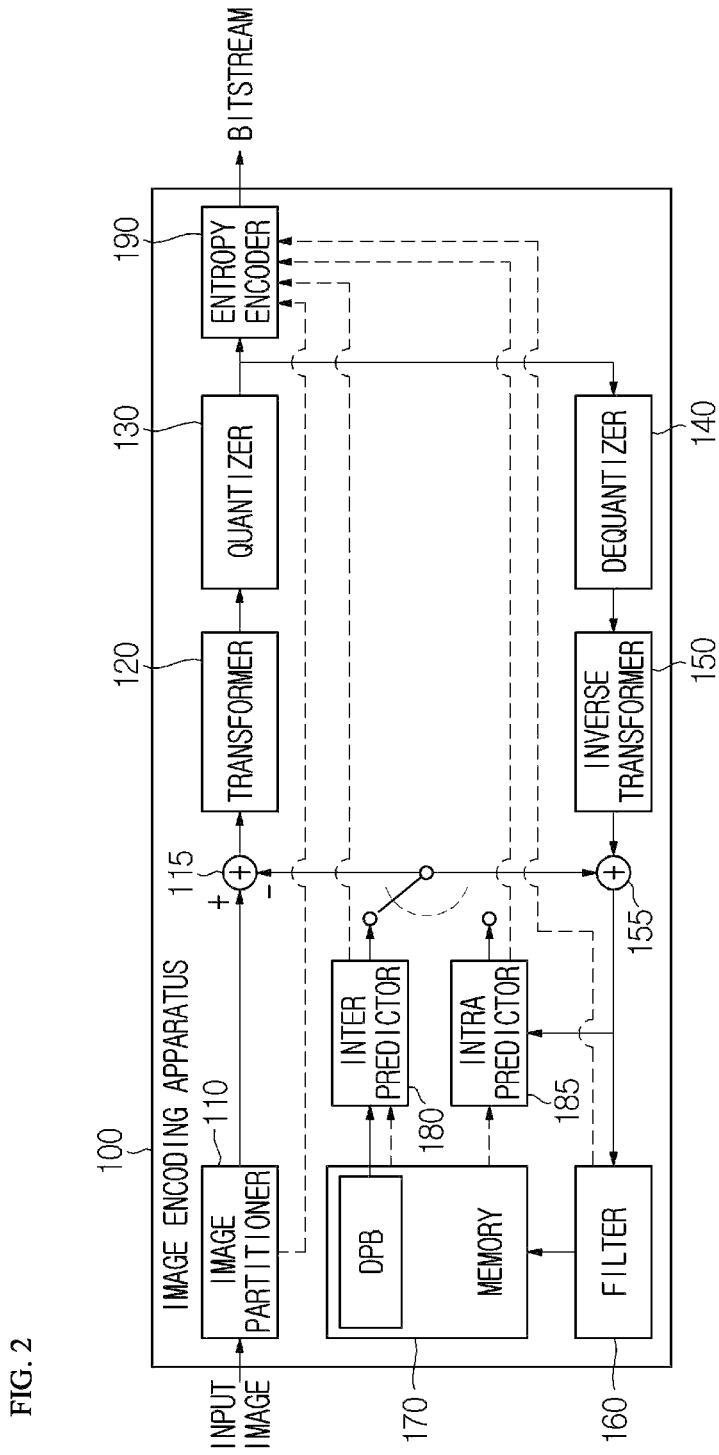
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
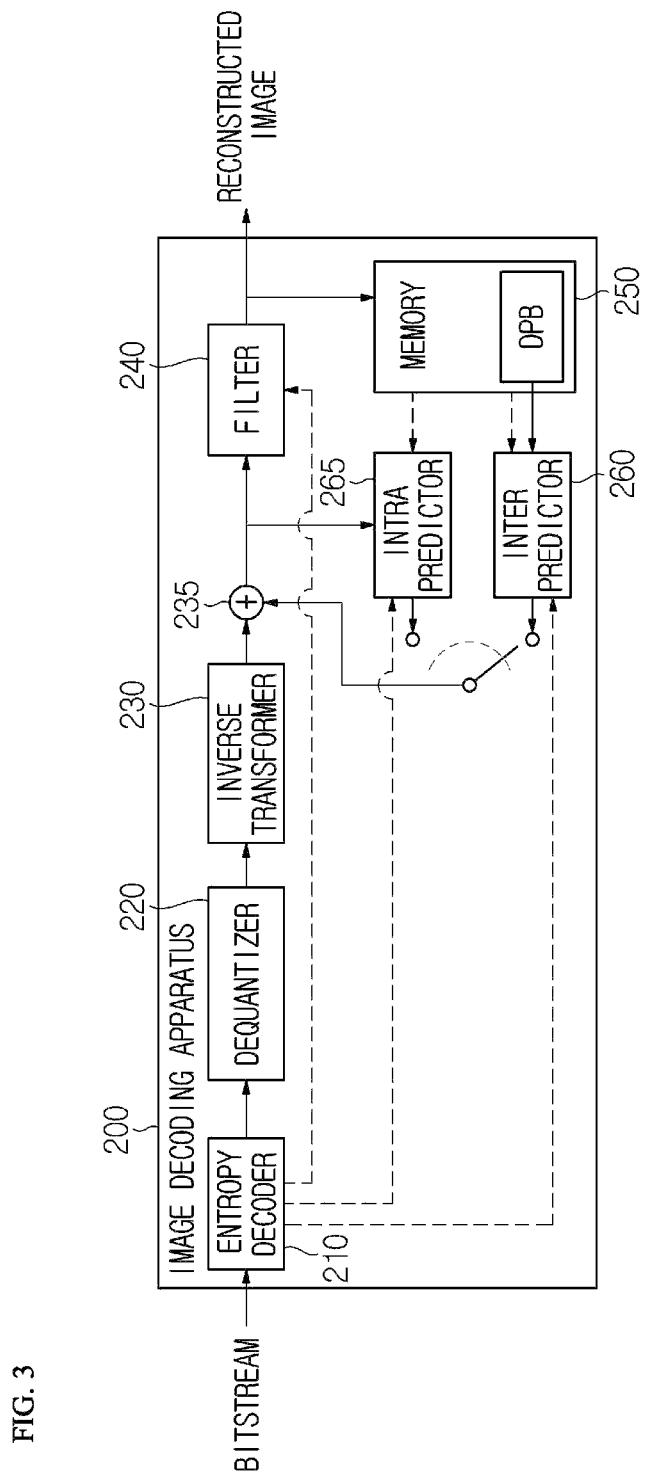
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Partitioning Structure

The image encoding/decoding method according to the present disclosure may be performed based on a partitioning structure according to an embodiment. For example, the procedures such as prediction, residual processing ((inverse) transform, (de)quantization, etc.), syntax element coding, and filtering may be performed based on a CTU, CU (and/or TU or PU) derived based on the partitioning structure. A block partitioning procedure may be performed by the image partitioner 110 of the above-described encoding apparatus and the partitioning related information may be encoded (processed) by the entropy encoder 190 and transmitted to the decoding apparatus in the form of a bitstream. The entropy decoder 210 of the decoding apparatus may derive a block partitioning structure of a current picture based on the partitioning related information obtained from the bitstream, and based on this, may perform a series of procedures (e.g., prediction, residual processing, block/picture reconstruction, in-loop filtering, etc.) for image decoding. A CU size and a TU size may be the same or a plurality of TUs may be present in a CU area. Meanwhile, the CU size may generally represent a luma component (sample) CB size. The TU size may generally represent a luma component (sample) TB size. A chroma component (sample) CB or TB size may be derived based on a luma component (sample) CB or TB size according to a component ratio according to a chroma format (color format, e.g., 4:4:4, 4:2:2, 4:2:0, etc.) of a picture/image. The TU size may be derived based on maxTbSize specifying an available maximum TB size. For example, when the CU size is greater than maxTbSize, a plurality of TUs (TBs) of maxTbSize may be derived from the CU and transform/inverse transform may be performed in units TUs (TBs). In addition, for example, when applying intra prediction, an intra prediction mode/type may be derived in units of CUs (or CBs), and a neighboring reference sample derivation and prediction sample generation procedure may be performed in units TUs (or TBs). In this case, one or a plurality of TUs (or TBs) may be present in one CU (or CB) area and, in this case, the plurality of TUs (or TBs) may share the same intra prediction mode/type.

In addition, in image encoding and decoding according to the present disclosure, an image processing unit may have a hierarchical structure. For example, one picture may be partitioned into one or more tiles or tile groups. One tile group may include one or more tiles. One tile may include one or more CTUs. The CTU may be partitioned into one or more CUs, as described above. The tile may consist of a rectangular region including CTUs assembled in a specific row and a specific column in a picture. The tile group may include an integer number of tiles according to tile-raster scan. A tile group header may signal information/parameters applicable to a corresponding tile group. When an encoding/decoding apparatus has a multi-core processor, an encoding/decoding procedure for the tile or tile group may be performed in parallel. Here, the tile group may have one of tile group types including an intra (I) tile group, a predictive (P) tile group and a bi-predictive (B) tile group. For blocks in the I tile group, inter prediction may not be used and only intra prediction may be used for prediction. Of course, even in this case, an original sample value may be coded and signalled without prediction. For blocks in the P tile group, intra prediction or inter prediction may be used, and only uni-prediction may be used when inter prediction. Meanwhile, for blocks in the B tile group, intra prediction or inter prediction may be used, and up to bi prediction may be used when inter prediction is used.

Figure 4:
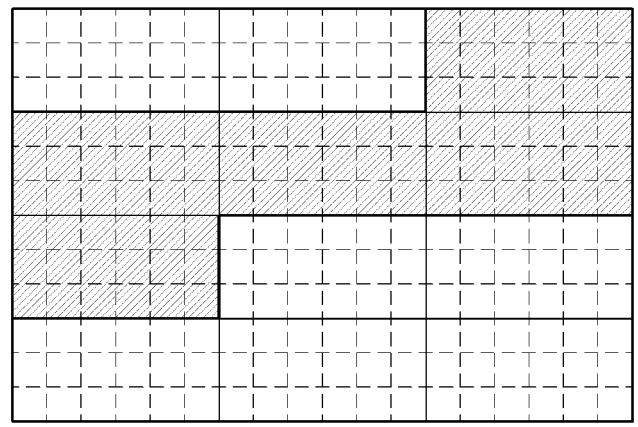
FIG. 4 is a view illustrating a slice and tile structure according to an embodiment.

In addition, one picture may be partitioned into one or more slices. A slice may be composed of an integer number of tiles or a set of CTUs continuously arranged in rows within one tile. Two modes of slices may be supported. One is a raster scan slice mode and the other is a rectangular slice mode. In the raster scan slice mode, a slice may be composed of consecutive tiles in a raster scan order present in one picture, as shown in FIG. 4. In the rectangular slice mode, a slice may be composed of tiles present in one picture in a rectangular shape. Tiles in a rectangular slice may be scanned within the slice according to the tile raster scan order.

In an encoding apparatus, a tile/tile group, a slice, and a maximum and minimum coding unit size may be determined according to the characteristics (e.g., resolution) of an image and in consideration of coding efficiency or parallel processing and information thereon or information capable of deriving the same may be included in a bitstream.

In a decoder, information specifying a slice of a current picture, a tile/tile group or a CTU in a tile is partitioned into a plurality of coding units may be obtained. When such information is obtained (transmitted) only under specific conditions, efficiency may increase.

The slice header or the tile group header (tile group header syntax) may include information/parameters commonly applicable to the slice or tile group. APS (APS syntax) or PPS (PPS syntax) may include information/parameters commonly applicable to one or more pictures. The SPS (SPS syntax) may include information/parameters commonly applicable to one or more sequences. The VPS (VPS syntax) may include information/parameters commonly applicable to the entire video. In the present disclosure, higher level syntax may include at least one of the APS syntax, the PPS syntax, the SPS syntax or the VPS syntax.

In addition, for example, information on partitioning and construction of the tile/tile group may be constructed at an encoding stage through the higher level syntax and transmitted to a decoding apparatus in the form of a bitstream.

In addition, in image encoding/decoding according to the present disclosure, a coding tree scheme may support luma and chroma component blocks to have a separate block tree structure. A case where luma and chroma blocks in one CTU have the same block tree structure may be represented as SINGLE_TREE. A case where luma and chroma blocks in one CTU have separate block tree structures may be represented as DUAL_TREE. In this case, a block tree type for a luma component may be referred to as DUAL_TREE_LUMA, and a block tree type for a chroma component may be referred to as DUAL_TREE_CHROMA. For P and B slice/tile groups, luma and chroma CTBs in one CTU may be limited to have the same coding tree structure. However, for I slice/tile groups, luma and chroma blocks may have separate block tree structures. When applying separate block tree modes, a luma CTB may be partitioned into CUs based on a specific coding tree structure and a chroma CTB may be partitioned into chroma CUs based on another coding tree structure. For example, a CU in I slice/tile group may be composed of a coding block of a luma component or coding blocks of two chroma components, and a CU of a P or B slice/tile group may be composed of blocks of three color components. Hereinafter, in the present disclosure, a slice may be referred to as a tile/tile group and a tile/tile group may be referred to as a slice.

Overview of Intra Prediction

Hereinafter, an intra prediction method according to an embodiment will be described. Intra prediction may indicate prediction which generates prediction samples for a current block based on reference samples in a picture to which the current block belongs (hereinafter referred to as a current picture). When intra prediction applies to the current block, neighboring reference samples to be used for intra prediction of the current block may be derived. The neighboring reference samples of the current block may include a sample adjacent to a left boundary of the current block having a size of nW×nH and a total of 2×nH samples neighboring to the bottom-left, a sample adjacent to a top boundary of the current block and a total of 2×nW samples neighboring to the top-right, and one sample neighboring the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block, and one sample neighboring the bottom-right of the current block. Meanwhile, when ISP which will be described later is applied, the neighboring reference samples may be derived in units of sub-partitions.

On the other hand, some of the neighboring reference samples of the current block have not yet been decoded or may not be available. In this case, a decoding apparatus may construct neighboring reference samples to be used for prediction, by substituting unavailable samples with available samples. Alternatively, neighboring reference samples to be used for prediction may be constructed using interpolation of available samples.

When the neighboring reference samples are derived, (i) a prediction sample may be derived based on average or interpolation of neighboring reference samples of the current block and (ii) the prediction sample may be derived based on a reference sample present in a specific (prediction) direction with respect to the prediction sample among the neighboring reference samples of the current block. The case of (i) may be referred to as a non-directional mode or a non-angular mode and the case of (ii) may be referred to as a directional mode or an angular mode. In addition, the prediction sample may be generated through interpolation with a second neighboring sample and a first neighboring sample located in the opposite direction of the prediction direction of the intra prediction mode of the current block based on the prediction sample of the current block among the neighboring reference samples. The above-described case may be referred to as linear interpolation intra prediction (LIP). In addition, chroma prediction samples may be generated based on luma samples using a linear model. This case may be called an LM mode. In addition, a temporary prediction sample of the current block may be derived based on filtered neighboring reference samples, and the prediction sample of the current block may be derived by weighted-summing the temporary prediction sample and at least one reference sample derived according to the intra prediction mode among the existing neighboring reference samples, that is, the unfiltered neighboring reference samples. The above-described case may be referred to as position dependent intra prediction (PDPC). In addition, a reference sample line with highest prediction accuracy may be selected from multiple neighboring reference sample lines of the current block to derive a prediction sample using a reference sample located in a prediction direction in the corresponding line, and, at this time, intra prediction encoding may be performed by indicating (signaling) the used reference sample line to a decoding apparatus. The above-described case may be referred to as multi-reference line (MRL) intra prediction or MRL based intra prediction. In addition, the current block may be divided into vertical or horizontal sub-partitions to perform intra prediction based on the same intra prediction mode, and neighboring reference samples may be derived and used in units of sub-partitions. That is, in this case, the intra prediction mode for the current block is equally applied to the sub-partitions and the neighboring reference samples are derived and used in units of sub-partitions, thereby increasing intra prediction performance. Such a prediction method may be referred to as intra sub-partitions (ISP) or ISP based intra prediction. In addition, when a prediction direction based on the prediction sample indicates a space between neighboring reference samples, that is, when the prediction direction indicates a fractional sample position, the value of the prediction sample may be derived through interpolation of a plurality of reference samples located around the prediction direction (around the fractional sample position). The above-described intra prediction methods may be referred to as intra prediction type to be distinguished from the intra prediction mode. In addition, after a prediction signal for a sub-sampled pixel set of the current block is generated using reconstructed neighboring pixels located on the left and top of the current block, the generated prediction signal and the neighboring sample value may be interpolated in the vertical and horizontal direction to generate the prediction signal having an original size, thereby applying matrix-weighted intra prediction (MIP) for performing intra prediction of the current block.

The intra prediction type may be referred to as various terms such as intra prediction scheme or additional intra prediction mode. For example, the intra prediction type (or the additional intra prediction mode) may include at least one of LIP, PDPC, MRL, ISP or MIP. Information on the intra prediction type may be encoded by an encoding apparatus, included in a bitstream and signaled to a decoding apparatus. Information on the intra prediction type may be implemented in various forms such as flag information indicating whether to apply each intra prediction type or index information indicating one of several intra prediction types.

Meanwhile, if necessary, post-filtering may be performed with respect to the derived prediction sample. Specifically, the intra prediction procedure may include an intra prediction mode/type determination step, a neighboring reference sample derivation step and an intra prediction mode/type based prediction sample derivation step. In addition, if necessary, post-filtering may be performed with respect to the derived prediction sample.

Hereinafter, a video/image encoding method based on intra prediction will be described. First, the encoding apparatus performs intra prediction with respect to a current block. The encoding apparatus may derive an intra prediction mode/type for the current block, derive neighboring reference samples of the current block, and generate prediction samples in the current block based on the intra prediction mode/type and the neighboring reference samples. Here, the intra prediction mode/type determination, neighboring reference samples derivation and prediction samples generation procedures may be simultaneously performed or any one procedure may be performed before the other procedures. Meanwhile, when the below-described prediction sample filtering procedure is performed, an intra predictor 185 may further include a prediction sample filter. The encoding apparatus may determine a mode/type applied to the current block among a plurality of intra prediction modes/types. The encoding apparatus may compare rate-distortion (RD) costs for the intra prediction modes/types and determine an optimal intra prediction mode/type for the current block.

Meanwhile, the encoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

Next, the encoding apparatus may generate residual samples for the current block based on the prediction samples. The encoding apparatus may compare the original samples of the current block with the prediction samples in terms of phase and derive the residual samples.

Next, the encoding apparatus may encode image information including information on the intra prediction (prediction information) and residual information on the residual samples. The prediction information may include the intra prediction mode information and the intra prediction type information. The encoding apparatus may output the encoded image information in the form of a bitstream. The output bitstream may be transmitted to the decoding apparatus through a storage medium or a network.

The residual information may include residual coding syntax, which will be described later. The encoding apparatus may transform/quantize the residual samples and derive quantized transform coefficients. The residual information may include information on the quantized transform coefficients.

Meanwhile, as described above, the encoding apparatus may generate a reconstructed picture (including reconstructed samples and reconstructed blocks). To this end, the encoding apparatus may perform inverse quantize/inverse transform with respect to the quantized transform coefficients and derive (modified) residual samples. The reason for transforming/quantizing the residual samples and then performing inverse quantization/inverse transform is to derive the same residual samples as residual samples derived by the decoding apparatus as described above. The encoding apparatus may generate a reconstructed bock including reconstructed samples for the current block based on the prediction samples and the (modified) residual samples. Based on the reconstructed block, the reconstructed picture for the current picture may be generated. As described above, an in-loop filtering procedure is applicable to the reconstructed picture.

Hereinafter, a video/image encoding method based on intra prediction will be described. The decoding apparatus may perform operation corresponding to operation performed by the encoding apparatus.

First, the decoding apparatus may derive an intra prediction mode/type for the current block based on the received prediction information (intra prediction mode/type information). The decoding apparatus may derive neighboring reference samples of the current block. The decoding apparatus may generate prediction samples in the current block based on the intra prediction mode/type and the neighboring reference samples. In this case, the decoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

The decoding apparatus may generate residual samples for the current block based on the received residual information. The decoding apparatus may generate reconstructed samples for the current block based on the prediction samples and the residual samples and derive a reconstructed block including the reconstructed samples. Based on the reconstructed block, the reconstructed picture for the current picture may be generated. An in-loop filtering procedure is further applicable to the reconstructed picture.

The intra prediction mode information may include, for example, flag information (e.g., intra_luma_mpm_flag) indicating whether a most probable mode (MPM) or a remaining mode is applied to the current block, and, when the MPM is applied to the current block, the prediction mode information may further include index information (e.g., intra_luma_mpm_idx) indicating one of the intra prediction mode candidates (MPM candidates). The intra prediction mode candidates (MPM candidates) may configure an MPM candidate list or an MPM list. For example, the MPM candidate list may include an intra prediction mode of a neighboring block or a preset basic intra prediction mode. In addition, when the MPM is not applied to the current block, the intra prediction mode information may further include remaining mode information (e.g., intra_luma_mpm_remainder) indicating one of the remaining intra prediction modes excluding the intra prediction mode candidates (MPM candidates). The decoding apparatus may determine the intra prediction mode of the current block based on the intra prediction mode information.

Meanwhile, when applying the above-described MIP mode, an MPM list for an MIP mode may be configured to determine the MIP mode of a current block. The MPM list for the MIP mode may be configured in a manner of configuring the above-described MPM list for the intra mode. For example, when applying the MIP mode, the MPM candidate list for the MIP mode may be configured to include an MIP mode of a neighboring block or a predetermined default MIP mode. In addition, when the MPM does not apply to the current block, the intra prediction mode information may further include remaining mode information (e.g., intra_luma_mpm_remainder) specifying one of the remaining MIP modes except for the MIP mode candidates (MPM candidates). The decoding apparatus may determine the MIP mode of the current block based on the intra prediction mode information.

Intra Prediction Mode

Figure 5:
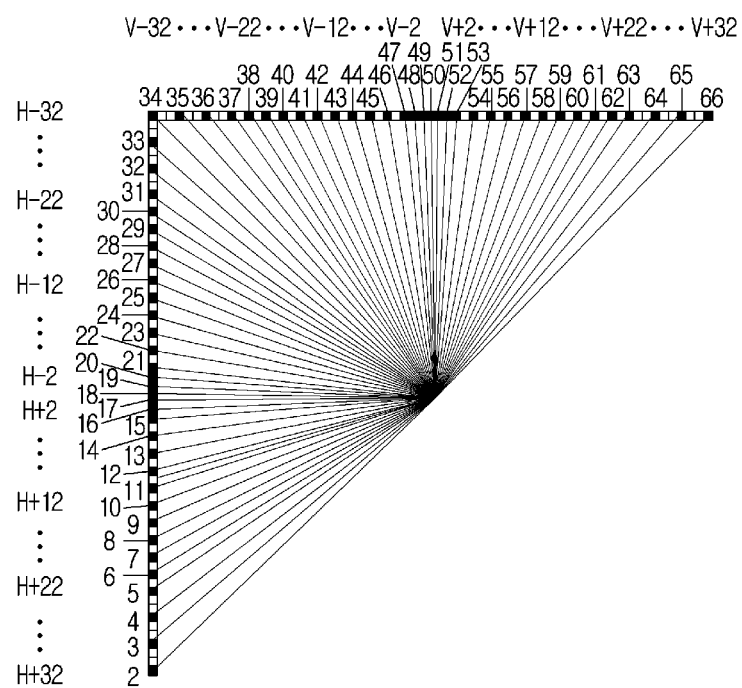
FIGS. 5 to 6 are views illustrating a directional intra prediction mode according to an embodiment.

Hereinafter, the intra prediction mode will be in greater detail. FIG. 5 shows an intra prediction direction according to an embodiment. In order to capture any edge direction presented in natural video, as shown in FIG. 5, the intra prediction mode may include two non-directional intra prediction modes and 65 directional intra prediction modes. The non-directional intra prediction modes may include a planar intra prediction mode and a DC intra prediction mode, and the directional intra prediction modes may include second to $66^{th}$ intra prediction modes.

Meanwhile, the intra prediction mode may further include a cross-component linear model (CCLM) mode for chroma samples in addition to the above-described intra prediction modes. The CCLM mode may be split into L_CCLM, T_CCLM, LT_CCLM according to whether left samples, upper samples or both thereof are considered for LM parameter derivation and may be applied only to a chroma component. For example, the intra prediction mode may be indexed according to the intra prediction mode value as shown in the following table.

TABLE 1

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

Figure 6:
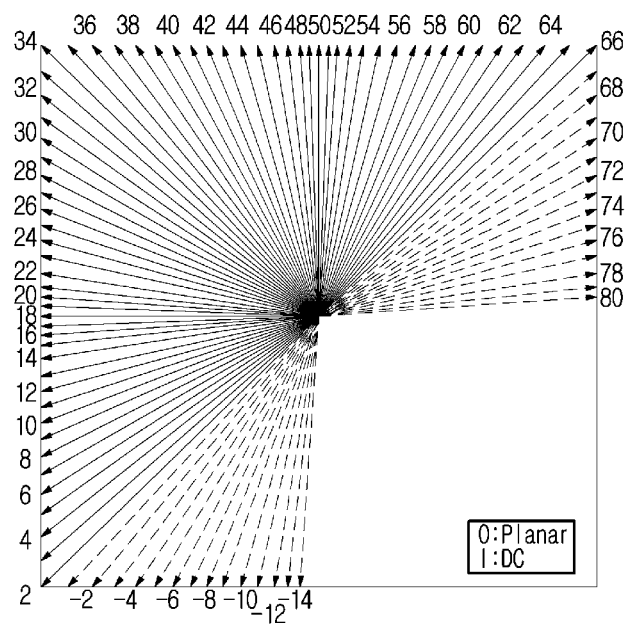

FIG. 6 shows an intra prediction direction according to another embodiment. Here, a dotted-line direction shows a wide angle mode applied only to a non-square block. As shown in FIG. 6, in order to capture any edge direction presented in natural video, the intra prediction mode according to an embodiment may include two non-directional intra prediction modes and 93 directional intra prediction modes. The non-directional intra prediction modes may include a planar intra prediction mode and a DC intra prediction mode, and the directional intra prediction modes may include second to $80^{th}$ and $-1^{st}$ to $-14^{th}$ intra prediction modes, as denoted by arrow of FIG. 6. The planar prediction mode may be denoted by INTRA_PLANAR, and the DC prediction mode may be denoted by INTRA_DC. In addition, the directional intra prediction mode may be denoted by INTRA_ANGULAR-14 to INTRA_ANGULAR-1 and INTRA_ANGULAR2 to INTRA_ANGULAR80.

Meanwhile, the intra prediction type (or the additional intra prediction mode) may include at least one of LIP, PDPC, MRL, ISP or MIP. The intra prediction type may be indicated based on intra prediction type information, and the intra prediction type information may be implemented in various forms. For example, the intra prediction type information may include intra prediction type index information indicating one of the intra prediction types. As another example, the intra prediction type information may include at least one of reference sample line information (e.g., intra_luma_ref_idx) indicating whether the MRL is applied to the current block and, if applied, which reference sample line is used, ISP flag information (e.g., intra_subpartitions_mode_flag) indicating whether the ISP is applied to the current block, ISP type information (e.g., intra_subpartitions_split_flag) indicating the split type of the sub-partitions when the ISP is applied, flag information indicating whether PDPC is applied, flag information indicating whether LIP is applied or MIP flag information indicating whether MIP is applied.

The intra prediction mode information and/or the intra prediction type information may be encoded/decoded using a coding method described in the present disclosure. For example, the intra prediction mode information and/or the intra prediction type information may be encoded/decoded based on a truncated (rice) binary code through entropy coding (e.g., CABAC, CAVLC).

Intra Prediction on Chroma Block

When intra prediction is performed with respect to a current block, prediction on a luma component block (luma block) and chroma component block (chroma block) of the current block may be performed. In this case, the intra prediction mode for the chroma block may be set separately from the intra prediction mode for the luma block.

For example, the intra prediction mode for the chroma block may be specified based on intra chroma prediction mode information, and the intra chroma prediction mode information may be signaled in the form of an intra_chroma_pred_mode syntax element. For example, the intra chroma prediction mode information may indicate one of a planar mode, a DC mode, a vertical mode, a horizontal mode, a derived mode (DM) and a CCLM. Here, the planar mode may indicate intra prediction mode #0, the DC mode may indicate intra prediction mode #1, the vertical mode may indicate intra prediction mode #26, and the horizontal mode may indicate intra prediction mode #10. DM may also be referred to as a direct mode. The CCLM may be referred to as LM.

Meanwhile, the DM and the CCLM are dependent intra prediction modes for predicting the chroma block using information on the luma block. The DM may indicate a mode in which the same intra prediction mode as the intra prediction mode for the luma component applies to the intra prediction mode for the chroma component. In addition, the CCLM may indicate an intra prediction mode using, as prediction samples of the chroma block, samples derived by subsampling reconstructed samples of the luma block in a process of generating the prediction block for the chroma block and then applying CCLM parameters a and β to the subsampled samples.

MPM List in Intra Prediction

When applying intra prediction, an intra prediction mode applying to a current block may be determined using an intra prediction mode of a neighboring block. For example, a decoding apparatus may select, based on an MPM index (e.g., intra_luma_mpm_idx) received using a bitstream, one of MPM candidates in an MPM list derived based on an intra prediction mode of neighboring blocks (e.g., left and/or top neighboring blocks) of the current block and additional candidate modes. Alternatively, the decoding apparatus may select one of remaining intra prediction modes which are not included in the MPM candidates based on remaining mode information (e.g., intra_luma_mpm_remainder). For example, whether an intra prediction mode applying to the current block is in the MPM candidates or in the remaining modes may be indicated based on an mpm flag (e.g., intra_luma_mpm_flag) to determine the intra prediction mode of the current block. The value 1 of the mpm flag may indicate that the intra prediction mode of the current block is in the MPM list (candidates) and the value 0 of the mpm flag may indicate that the intra prediction mode of the current block is not in the MPM list (candidates).

The mpm flag may be signaled in the form of an intra_luma_mpm_flag syntax element, an mpm index may be signaled in the form of an mpm_idx or intra_luma_mpm_idx syntax element, and remaining intra prediction mode information may be signaled in the form of a rem_intra_luma_pred_mode or intra_luma_mpm_remainder syntax element. In an embodiment, the remaining intra prediction mode information may specify one of the remaining intra prediction modes which are not included in the mpm list of all intra prediction modes and are indexed in order of prediction mode numbers. The intra prediction mode may be an intra prediction mode for a luma component (sample). Hereinafter, intra prediction mode information may include at least one of an mpm flag (e.g. intra_luma_mpm_flag), an mpm index (e.g. mpm_idx or intra_luma_mpm_idx), or a remaining intra prediction mode information (e.g. rem_intra_luma_pred_mode or intra_luma_mpm_remainder). In this disclosure, an MPM list may be referred to as various terms such as an MPM candidate list, candModeList, etc.

The MPM list may include candidate intra prediction modes (MPM candidates) which are highly likely to apply to the current block. The MPM list may be configured to include an intra prediction mode of a neighboring block, and may be configured to further include predetermined intra prediction modes according to a predetermined method.

In an embodiment, in order to maintain complexity of generating the MPM list low, an MPM list including three MPMs may be generated. For example, even when 67 intra prediction modes are used, the MPM list may include three MPM candidates. When an intra prediction mode for a current block is not included in the MPM list, a remaining mode may be used. In this case, the remaining mode may include 64 remaining candidates, remaining intra prediction mode information specifying one of the 64 remaining candidates may be signaled. For example, the remaining intra prediction mode information may include a 6-bit syntax element (e.g. a rem_intra_luma_pred_mode or intra_luma_mpm_remainder syntax element).

In an embodiment, neighboring intra modes, derived intra modes and default intra modes may be considered to configure the MPM list. For example, the encoding apparatus may use a prediction mode of a neighboring block to encode the prediction mode of the current block.

For example, the encoding apparatus may confirm or derive the prediction mode of the neighboring block when the neighboring block is encoded in an intra prediction mode. For example, the encoding apparatus may determine the prediction mode of the current block based on the prediction mode of a left neighboring block and the prediction mode of a top neighboring block, and, in this case, the prediction mode of the corresponding neighboring block may be determined to be a most probable mode (MPM). In this regard, determining the MPM may be expressed as listing up MPM candidates or configuring an MPM list.

In an embodiment, the left neighboring block may specify a block located at the uppermost side of the neighboring blocks adjacent to the left boundary of the current block. In addition, the top neighboring block may specify a block located at the leftmost side of neighboring blocks adjacent to the top boundary of the current block. The encoding apparatus may determine whether the prediction mode of the left neighboring block and the prediction mode of the top neighboring block are the same. An initial MPM list may be formed by performing a pruning process on intra prediction modes of the two adjacent blocks. The pruning process may be performed such that only different prediction modes are included in the MPM list.

If the prediction mode of the left neighboring block and the prediction mode of the top neighboring block are not the same, a first MPM may be set to the prediction mode of the left neighboring block, a second MPM may be set to the prediction mode of the top neighboring block, a third MPM may be set to one of an intra planar mode, an intra DC mode, or an intra vertical mode (intra prediction mode #50). Specifically, when intra prediction modes of the two neighboring blocks are different from each other, the two intra prediction modes may be set to the MPM, and one of default intra modes may be added to the MPM list after pruning check by the MPMs. Here, the default intra modes may include an intra planar mode, an intra DC mode and/or an intra vertical mode (intra prediction mode #50).

For example, when the prediction mode of the left neighboring block and the prediction mode of the top neighboring block are not the same, the MPM list may be configured according to the following cases.

Case 1: If both the intra prediction mode of the left neighboring block and the intra prediction mode of the top neighboring block are not an intra planar mode, the MPM list may be configured to include the intra prediction mode of the left neighboring block, the intra prediction mode of the top neighboring block and the intra planar mode.

Case 2: When the condition of Case 1 is not satisfied, if both the intra prediction mode of the left neighboring block and the intra prediction mode of the top neighboring block are not an intra DC mode, the MPM list may be configured to include the intra prediction mode of the left neighboring block, the intra prediction mode of the top neighboring block and the intra DC mode.

Case 3: When the condition of Case 2 is not satisfied, the MPM list may be configured to include the intra prediction mode of the left neighboring block, the intra prediction mode of the top neighboring block and the intra vertical mode.

Meanwhile, when the prediction mode of the left neighboring block and the prediction mode of the top neighboring block are the same, the encoding apparatus may determine whether the prediction mode of the left neighboring block is less than 2. For example, the encoding apparatus may determine whether the prediction mode of the left neighboring block is an intra planar mode, an intra DC mode or a prediction mode having directionality indicating a block located at the bottom of the current block as shown in FIG. 6.

If the prediction mode of the left neighboring block is less than 2, a first MPM may be set to an intra planar mode, a second MPM may be set to an intra DC mode, and a third MPM may be set to an intra vertical mode (intra prediction mode #50).

Meanwhile, if the prediction mode of the left neighboring block is not less than 2, a first MPM may be set to the prediction mode of the left neighboring block, a second MPM may be set to (the prediction mode of the left neighboring block−1), and a third MPM may be set to (the prediction mode of the left neighboring block+1).

For example, when the prediction mode of the left neighboring block and the prediction mode of the top neighboring block are the same, the MPM list may be configured as follows.

Case 1: When the value of the intra prediction mode of the left neighboring block is less than 2, the MPM list may be configured to include an intra planar mode, an intra DC mode and an intra vertical mode.

Case 2: When the condition of Case 1 is not satisfied, the MPM list may be configured to include the intra prediction mode of the left neighboring block and an intra prediction mode corresponding to a value of 2+((A+61)%64) and an intra prediction mode corresponding to a value of 2+((A−1)%64) when the value of the intra prediction mode of the left neighboring block is A.

Meanwhile, an additional pruning process of removing duplicate modes may be performed such that only unique modes are included. In addition, for entropy coding of 64 non-MPM modes except for the three MPMs, a 6-bit fixed length code may be used. That is, an index indicating the 64 non-MPM modes may be entropy-coded into a 6-bit Fixed Length Code (6-bit FLC).

In addition, the encoding apparatus may determine whether an optimal intra prediction mode which will apply to the current block belongs to the MPM candidates configured above.

If the intra prediction mode of the current block belongs to the MPM candidates, the encoding apparatus may encode an MPM flag and an MPM index. Here, the MPM flag may specify whether the intra prediction mode of the current block is derived from a neighboring intra-predicted block (that is, the intra prediction mode of the current block belongs to the MPM). In addition, the MPM index may specify which MPM mode applies as the intra prediction mode of the current block among the MPM candidates.

In contrast, if the intra prediction mode of the current block does not belong to the MPM candidates, the encoding apparatus may encode the intra prediction mode of the current block using the remaining mode.

Meanwhile, in an embodiment, the encoding apparatus and the decoding apparatus may configure an MPM list including 6 MPMs. In order to generate the MPM list including 6 MPMs, a default MPM list may be considered. The default MPM list may be configured as follows, when the value of the intra prediction mode of the left neighboring block is A.

default 6 MPM list={A, Planar (0) or DC (1), Vertical (50), HOR (18), VER−4 (46), VER+4 (54)}

Furthermore, by performing the pruning process on the intra mode of two neighboring blocks, the default 6-MPM list may be updated to generate a 6-MPM list. For example, when the intra prediction modes of two neighboring blocks are the same and the values of the intra prediction modes of the two neighboring blocks are greater than a value 1 of an intra DC mode, the 6-MPM list may include the intra prediction mode, intra planar mode and intra DC mode of the left neighboring block which are the default modes, and further include three derived modes derived by adding a predetermined offset value to the intra prediction modes of the neighboring blocks and performing modulo operation with respect to the total number of intra prediction modes.

Meanwhile, when the intra prediction modes of the neighboring blocks are different from each other, the 6-MPM list may be configured by including the intra prediction mode of two neighboring blocks as the first two MPM modes. The remaining four MPM modes may be derived from a default mode and the intra prediction modes of the neighboring blocks.

The above-described MPM list configuration method may be used when MIP does not apply to the current block. For example, the above-described MPM list configuration method may be used to derive an intra prediction mode used in LIP, PDPC, MRL, ISP intra prediction or normal intra prediction (non-directional intra prediction and directional intra prediction). However, the left neighboring block or the top neighboring block may be coded based on the above-described MIP. In this case, if the MIP mode number of a neighboring block (left neighboring block/top neighboring block), to which the MIP applies, applies to the MPM list for the current block, to which the MIP does not apply, without change, it may be inappropriate as an unintentional intra prediction mode is indicated. Accordingly, in this case, the intra prediction mode of the neighboring block (left neighboring block/top neighboring block), to which the MIP applies, may be regarded as a DC or planar mode. Alternatively, as another example, an intra prediction mode of a neighboring block (left neighboring block/top neighboring block), to which the MIP applies, may be mapped to a normal intra prediction mode based on a mapping table and used to configure the MPM list. In this case, the mapping may be performed based on the block size type of the current block. For example, the mapping table according to an embodiment shown in FIG. 7 may be used for the mapping.

In the table of FIG. 7, MIP IntraPredMode[xNbX][yNbX] specifies the MIP mode of the neighboring block (left neighboring block/top neighboring block), and a block size type MipSizeId specifies the block size type of the neighboring block or the current block. Numbers below block size type values 0, 1 and 2 indicate normal intra prediction modes, to which the MIP mode is mapped, in case of each block size type. For example, the case where the height and width of the current block are 4 may be referred to as block size type 0, the case where both the height and width of the current block are equal to or less than 8 may be referred to as block size type 1, and the other case may be referred to as block size type 2.

Here, the normal intra prediction mode is an intra prediction mode other than an MIP mode and may mean a non-directional intra prediction mode or a directional intra prediction mode. For example, when the block size type of the current block is 0 and the MIP mode number of the neighboring block is 10, a mapped normal intra prediction mode number may be 18. However, the mapping relationship may be an example and may be changed.

In addition, in an embodiment, an intra planar mode may not be included in the MPM list. For this, information specifying whether the intra prediction mode of the current block is an intra planar mode may be separately signaled. When the prediction mode of the current block is not an intra planar mode, an MPM list may be generated to signal the intra prediction mode. The encoding apparatus may signal the intra prediction mode of the current block to the decoding apparatus using the MPM list generated as follows in encoding the current block, and the decoding apparatus may determine the intra mode of the current block using the generated MPM list as follows.

The MPM list may be determined based on the intra prediction mode of the neighboring block of the current block. For example, the MPM list may be determined based on the intra prediction modes of the left neighboring block and top neighboring block of the current block. For example, the encoding apparatus and the decoding apparatus may determine the MPM list based on a first intra prediction candidate determined based on the intra prediction mode of the left neighboring block and a second intra prediction candidate determined based on the intra prediction mode of the top neighboring block.

Here, the top neighboring block may be a block located at the rightmost side among blocks adjacent to the top of the current block. The left neighboring block may be a block located at a lowermost side among blocks adjacent to the left of the current block. For example, when the coordinates of the current block are (xCb, yCb), the width of the current block is cbWidth and the height of the current block is cbHeight, the coordinates of the left neighboring block may be (xCb−1, yCb+cbHeight−1) and the coordinates of the top neighboring block may be (xCb+cbWidth−1, yCb−1).

The encoding apparatus and the decoding apparatus may determine the value of the first intra prediction candidate to be a value (e.g., 0) specifying an intra planar mode, when the left neighboring block is not available, when the prediction mode of the left neighboring block is not an intra prediction mode or when the prediction mode of the left neighboring block is an MIP mode. The encoding apparatus and the decoding apparatus may determine the value of the first intra prediction candidate to be a value specifying the intra prediction mode of the left neighboring block when the left neighboring block does not satisfy such a condition.

In addition, the encoding apparatus and the decoding apparatus may determine the value of the second intra prediction candidate to be a value (e.g., 0) specifying an intra planar mode, when the top neighboring block is not available, when the prediction mode of the top neighboring block is not an intra prediction mode or when the prediction mode of the top neighboring block is an MIP mode. The encoding apparatus and the decoding apparatus may determine the value of the second intra prediction candidate to be a value specifying the intra prediction mode of the top neighboring block, when the top neighboring block does not satisfies such a condition.

In an embodiment, the MPM list may be configured to include five candidate modes. In an embodiment, the MPM list may be configured according to the following cases. Hereinafter, the first intra prediction candidate is referred to as candIntraPredModeA, the second intra prediction candidate is referred to as candIntraPredModeB, and MPM list is referred to as candModeList[x]. Here, x may be an integer of 0 to 4.

Case 1: When the value of the first intra prediction candidate and the value of the second intra prediction candidate are the same and the value of the first intra prediction candidate is greater than 1 (e.g., when it is not an intra planar mode or intra DC mode), the MPM list candModeList[x] may be configured as follows.

candModeList[0]=candIntraPredModeA candModeList[1]=2+((candIntraPredModeA+61)%64)

candModeList[2]=2+((candIntraPredModeA−1)%64)

candModeList[3]=2+((candIntraPredModeA+60)%64)

candModeList[4]=2+(candIntraPredModeA %64)

Case 2: In the case where the condition of Case 1 is not satisfied, when the value of the first intra prediction candidate and the value of the second intra prediction candidate are not the same and the value of the first intra prediction candidate or the value of the second intra prediction candidate is greater than 1 (e.g., it is not an intra planar mode or intra DC mode), the MPM list candModeList[x] may be configured as follows.

First, minAB and maxAB may be calculated as follows.

minAB=Min(candIntraPredModeA, candIntraPredModeB)

maxAB=Max(candIntraPredModeA, candIntraPredModeB)

When both the values of the first intra prediction candidate and the second intra prediction candidate are greater than 1, the MPM list candModeList[0] and candModeList[1] may be configured as follows.

candModeList[0]=candIntraPredModeA candModeList[1]=candIntraPredModeB

In this case, when the value of maxAB−minAB is 1, candModeList[2] to candModeList[4] may be configured as follows.

candModeList[2]=2+((minAB+61)%64)

candModeList[3]=2+((maxAB−1)%64)

candModeList[4]=2+((minAB+60)%64)

Meanwhile, when the value of maxAB−minAB is equal to or greater than 62, candModeList[2] to candModeList[4] may be configured as follows.

candModeList[2]=2+((minAB−1)%64)

candModeList[3]=2+((maxAB+61%64)

candModeList[4]=2+(minAB %64)

Meanwhile, when the value of maxAB−minAB is 2, candModeList[2] to candModeList[4] may be configured as follows.

candModeList[2]=2+((minAB−1)%64)

candModeList[3]=2+((minAB+61)%64)

candModeList[4]=2+((maxAB−1)%64)

Meanwhile, when the value of maxAB−minAB does not satisfy the above conditions, candModeList[2] to candModeList[4] may be configured as follows.

candModeList[2]=2+((minAB+61)%64)

candModeList[3]=2+((minAB−1)%64)

candModeList[4]=2+((maxAB+61)%64)

Meanwhile, when both the values of the first intra prediction candidate and the second intra prediction candidate are not greater than 1 and only any one of the first intra prediction candidate and the second intra prediction candidate is greater than 1, the MPM list candModeList[x] may be configured as follows.

candModeList[0]=maxAB candModeList[1]=2+((maxAB+61)%64)

candModeList[2]=2+((maxAB−1)%64)

candModeList[3]=2+((maxAB+60)%64)

candModeList[4]=2+(maxAB %64)

Case 3: When the condition of Case 2 is not satisfied, the MPM list candModeList[x] may be configured as follows.

candModeList[0]=INTRA_DC candModeList[1]=INTRA_ANGULAR50 candModeList[2]=INTRA_ANGULAR18 candModeList[3]=INTRA_ANGULAR46 candModeList[4]=INTRA_ANGULAR54

Overview of MIP

A matrix based intra prediction (MIP) mode may be called an affine linear weighted intra prediction (ALWIP) mode, a linear weighted intra prediction (LWIP) mode or a matrix weighted intra prediction (MWIP) mode.

When the MIP mode applies for the current block, i) neighboring reference samples on which an averaging step is performed may be used, ii) a matrix-vector-multiplication step may be performed, iii) if necessary, a horizontal/vertical interpolation may be further performed, thereby deriving prediction samples of the current block.

Figure 8:
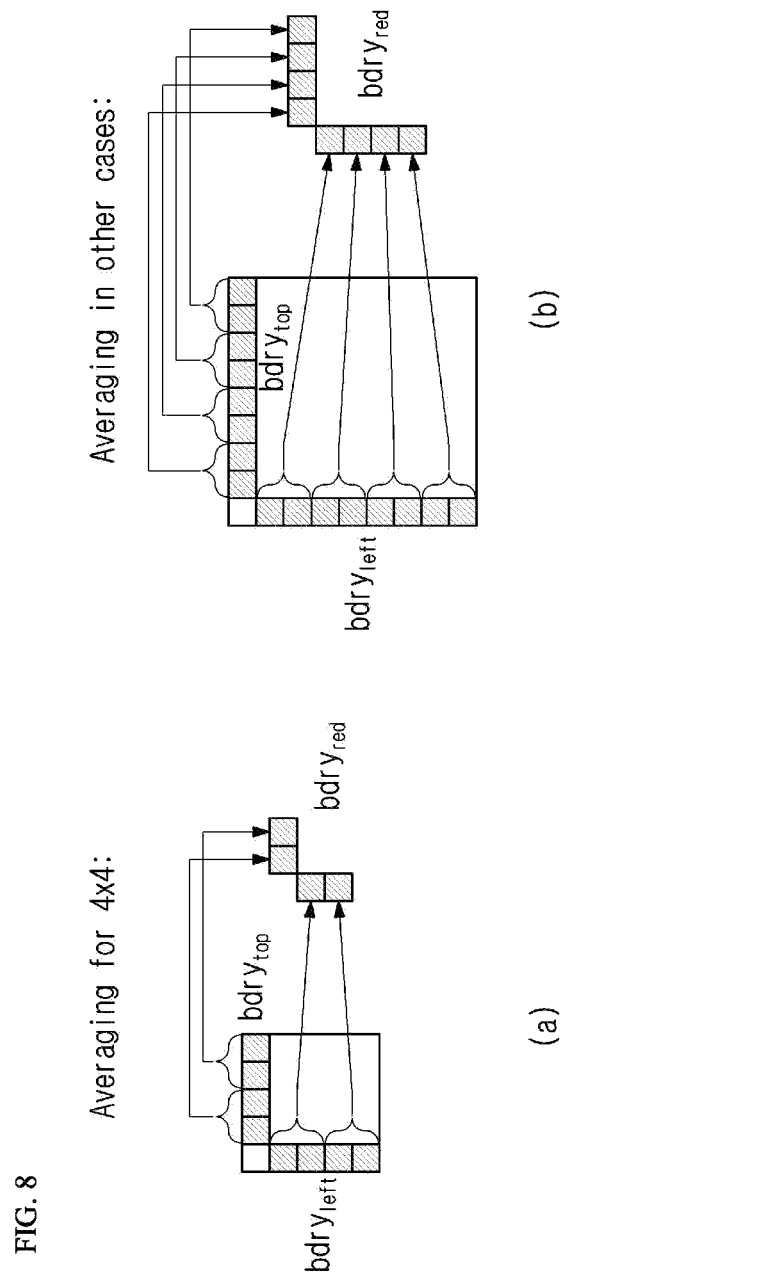
FIGS. 8 and 9 are reference views illustrating an MIP mode according to an embodiment.

The averaging step may be performed by averaging the values of neighboring samples. The averaging procedure may be performed by taking averaging of each boundary and generating a total of four samples including two top samples and two left samples when the width and width of the current block are 4 in pixel units as shown in (a) of FIG. 8 and may be performed by taking averaging of each boundary and generating a total of eight samples including four top samples and four left samples when the width and width of the current block are not 4 in pixel units as shown in (b) of FIG. 8.

The matrix-vector-multiplication step may be performed by multiplying an averaged sample by a matrix vector and then adding an offset vector, thereby generating a prediction signal for a subsampled pixel set of an original block. The size of the matrix and the offset vector may be determined according to the width and width of the current block.

Figure 9:
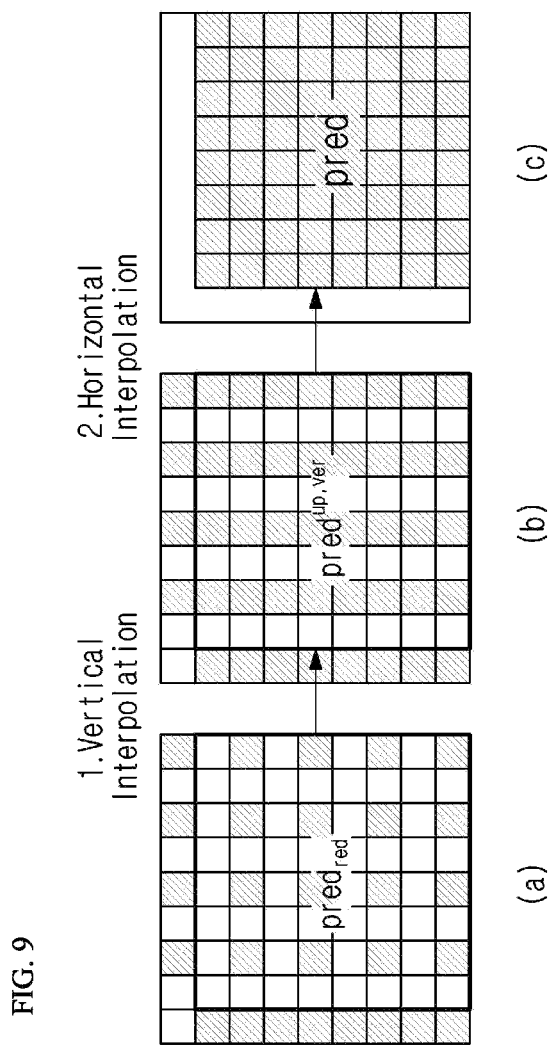

The horizontal/vertical interpolation step is a step of generating the prediction signal of an original block size from the subsampled prediction signal. As shown in FIG. 9, the prediction signal of the original block size may be generated by performing vertical and horizontal interpolation using a subsampled prediction signal and a neighboring pixel value. FIG. 9 shows an embodiment of performing MIP prediction with respect to an 8×8 block. In case of the 8×8 block, as shown in (b) of FIG. 8, a total of eight averaged samples may be generated. By multiplying eight averaged samples by a matrix vector and adding an offset vector, as shown in (a) of FIG. 9, 16 sample values may be generated an even-number coordinate position. Thereafter, as shown in (b) of FIG. 9, vertical interpolation may be performed using an average value of top samples of the current block. Thereafter, as shown in (c) of FIG. 9, horizontal interpolation may be performed using the left sample of the current block.

Intra prediction modes used for the MIP mode may be configured differently from intra prediction modes used for the above-described LIP, PDPC, MRL and ISP intra prediction or normal intra prediction. The intra prediction mode for the MIP mode may be called an MIP intra prediction mode, an MIP prediction mode or an MIP mode. For example, a matrix and offset used for the matrix-vector-multiplication may be differently set according to the intra prediction mode for MIP. Here, the matrix may be called an (MIP) weight matrix, and the offset may be called an (MIP) offset vector or (MIP) bias vector.

The above-described the intra prediction type information may include an MIP flag (e.g., intra_mip_flag) specifying whether the MIP mode applies to the current block. When the MIP mode applies to the current block (e.g., the value of intra_mip_flag is 1), the MPM list for the MIP mode may be separately configured. In addition, the intra prediction type information may include an MIP MPM flag (e.g., intra_mip_mpm_flag) specifying whether the MPM list is used for the MIP mode, an MPM index (e.g., intra_mip_mpm_idx) specifying the MIP mode used for the current block of the MPM list, and remaining intra prediction mode information (e.g., intra_mip_mpm_remainder) used to directly specify the MIP mode when the MIP mode of the current block is not used in the MPM list.

When the MIP mode is performed, various MIP modes may be set according to the matrix and offset configuring the MIP. The number of intra prediction modes for the MIP may be differently set based on the size of the current block. For example, i) when the height and width of the current block (e.g., CB or TB) are 4, 35 intra prediction modes (that is, intra prediction modes 0 to 34) may be available, ii) when both the height and width of the current block are less to or equal to 8, 19 intra prediction modes (that is, intra prediction modes 0 to 18) may be available, iii) in the other cases, 11 intra prediction modes (that is, intra prediction modes 0 to 10) may be available.

For example, when the case where the height and width of the current block are 4 is referred to as block size type 0, the case where both the height and width of the current block are less than or equal to 8 may be referred to as block size type 1, and the other cases are referred to as block size type 2, the number of intra prediction modes for MIP may be summarized as shown in the following table. However, this is an example and the block size type and the number of available intra prediction mode may be changed.

TABLE 2

| block size type (MipSizeId) | number of MIP intra prediction modes | MIP intra prediction mode |
|---|---|---|
| 0 | 35 | 0 . . . 34 |
| 1 | 19 | 0 . . . 18 |
| 2 | 11 | 0 . . . 10 |

In an embodiment, information on the intra prediction mode/type of the current block may be coded and signaled at a level such as a CU (CU syntax) or may be implicitly determined according to the condition. In this case, this may be explicitly signaled for some modes/types and may be implicitly derived for the remaining modes. For example, the CU syntax may carry information on an (intra) prediction mode/type, as shown in FIGS. 10 to 12.

Here, pred_mode_flag may specify the prediction mode of a current CU. For example, a value 0 of pred_mode_flag may specify that the current CU is encoded in an inter prediction mode. A value 1 of pred_mode_flag may specify that the current CU is encoded in an intra prediction mode.

pcm_flag[x0][y0] may specify whether a pulse coding modulation (PCM) mode applies to the current block. When the PCM mode applies to the current block, a value of an original sample in the current block may be coded and signaled without applying prediction/transform/quantization. For example, pcm_flag[x0][y0] may specify that a pcm_sample syntax is present and whether a transfrom_tree( ) syntax is not present, for a luma CU corresponding to a (x0, y0) position. For example, a value 1 of pcm_flag[x0][y0] may specify that a pcm_sample( ) syntax is present and atransform_tree( ) syntax is not present. A value 0 of pcm_flag[x0][y0] may specify that a pcm_sample( ) syntax is present and a transform_tree( ) syntax is present.

intra_mip_flag[x0][y0] may specify whether the current block is predicted in the MIP mode. For example, a first value (e.g., 0) of intra_mip_flag[x0][y0] may specify that the current block is not predicted in the MIP mode. A second value (e.g., 1) of intra_mip_flag[x0][y0] may specify that the current block is predicted in the MIP mode.

When intra_mip_flag[x0][y0] has a second value (e.g., 1), information on the MIP mode may be further obtained from a bitstream. For example, intra_mip_mpm_flag[x0][y0], intra_mip_mpm_idx[x0][y0] and intra_mip_mpm_remainder [x0][y0] syntax elements which are information specifying the MIP mode of the current block may be further obtained from the bitstream. When an MIP prediction mode applies to the current block, an MPM list for MIP may be configured, and the intra_mip_mpm_flag may specify whether the MIP mode for the current block is present in the MPM list for MIP (or MPM candidates). The intra_mip_mpm_idx may specify the index of a candidate used as the MIP prediction mode of the current block among the candidates in the MPM list, when the MIP prediction mode for the current block is present in the MPM list for MIP (that is, the value of intra_mip_mpm_flag is 1). intra_mip_mpm_remainder may specify the MIP prediction mode of the current block when the MIP prediction mode for the current block is not present in the MPM list for MIP (that is, the value of intra_mip_mpm_flag is 0), and specify any one of all MIP prediction modes or specify any one of the remaining modes except for the candidate mode in the MPM list for MIP among all the MIP prediction modes as the MIP prediction mode of the current block.

Meanwhile, when intra_mip_flag[x0][y0] has a first value (e.g., 0), information on MIP may not be obtained from the bitstream and intra prediction information other than MIP may be obtained from the bitstream. In an embodiment, intra_luma_mpm_flag[x0][y0] specifying whether an MPM list for normal intra prediction is generated may be obtained from the bitstream.

When the intra prediction mode applies to the current block, an MPM list therefor may be configured, intra_luma_mpm_flag may specify an intra prediction mode for the current block is present in the MPM list (or MPM candidates). For example, a first value (e.g., 0) of intra_luma_mpm_flag may specify that the intra prediction mode of the current block is not present in the MPM list. A second value (e.g., 1) of intra_luma_mpm_flag may specify that the intra prediction mode of the current block is present in the MPM list. When the value of intra_luma_mpm_flag is 1, the intra_luma_not_planar_flag may be obtained from the bitstream.

intra_luma_not_planar_flag may specify whether the intra prediction mode of the current block is a planar mode or not. For example, a first value (e.g., 0) of intra_luma_not_planar_flag may specify that the intra prediction mode of the current block is a planar mode. A second value (e.g., 1) of intra_luma_not_planar_flag may specify that the intra prediction mode of the current block is not a planar mode.

intra_luma_mpm_idx may be parsed and coded when intra_luma_not_planar_flag is 'true' (that is, value 1). In an embodiment, a planar mode may always be included in the MPM list as a candidate. However, as described above, the planar mode may be excluded from the MPM list by first signaling intra_luma_not_planar_flag, and, in this case, a unified MPM list may be configured in the above-described various intra prediction types (normal intra prediction, MRL, ISP, LIP, etc.). In this case, the number of candidates in the MPM list may be reduced to 5. intra_luma_mpm_idx may specify candidates used in the intra prediction mode of the current block among the candidates included in the MPM list from which the planar mode is excluded.

Meanwhile, when the value of intra_luma_mpm_flag is 0, the intra_luma_mpm_remainder may be parsed/coded. intra_luma_mpm_remainder may specify one of all the intra prediction modes as the intra prediction mode of the current block or may specify any one of the remaining modes except for the candidate modes in the MPM list as the intra prediction mode of the current block.

MPM List Configuration in MIP

When MIP applies to the current block, an MPM list for the current block to which MIP applies may be separately configured. The MPM list may be referred to as various names such as an MIP MPM list (or an MPM list for MIP or candMipModeList) in order to be distinguished from the MPM list when the MIP does not apply to the current block. Hereinafter, for distinguishment, this is expressed as an MIP MPM list or may also be referred to as an MPM list.

The MIP MPM list may include n candidates, and, for example, n may be 3. The MIP MPM list may be configured based on the left neighboring block and top neighboring block of the current block. Here, the left neighboring block may be a block located at an uppermost side among neighboring blocks adjacent to the left boundary of the current block. In addition, the top neighboring block may indicate a block located at a leftmost side among neighboring blocks adjacent to the top boundary of the current block. For example, when the coordinates of the current block are (xCb, yCb), the coordinates of the left neighboring block may be (xCb−1, yCb) and the coordinates of the top neighboring block may be (xCb, yCb−1). Alternatively, the left neighboring block may be a block located at a lowermost side among neighboring blocks adjacent to the left boundary of the current block. In addition, the top neighboring block may be a block located at a rightmost side among neighboring blocks adjacent to the top boundary of the current block.

When MIP applies to the left neighboring block, a first candidate intra prediction mode may be set to be the same as the MIP intra prediction mode of the left neighboring block. Here, the first candidate intra prediction mode may be expressed as candMipModeA. In addition, for example, when MIP applies to the top neighboring block, a second candidate intra prediction mode may be set to be the same as the MIP intra prediction mode of the top neighboring block. Here, the second candidate intra prediction mode may be expressed as candMipModeB.

Meanwhile, a candidate intra prediction mode may be determined by comparing the sizes of the current block and the neighboring block. For example, when MIP applies to the left neighboring block and the block size type of the left neighboring block is the same as block size type of the current block, the first candidate intra prediction mode (e.g. candMipModeA) may be set to be the same as the MIP intra prediction mode of the left neighboring block. In addition, when MIP applies to the top neighboring block and the block size type of the top neighboring block is the same as the block size type of the current block, the second candidate intra prediction mode (e.g., candMipModeB) may be set to be the same as the MIP intra prediction mode of the top neighboring block.

Meanwhile, the left neighboring block or the top neighboring block may be encoded based on intra prediction other than MIP. For example, the left neighboring block or the top neighboring block may be encoded in another intra prediction mode other than MIP. In this case, it is not appropriate to use a normal intra prediction mode number of a neighboring block (e.g., the left neighboring block or the top neighboring block) to which MIP does not apply as a candidate intra mode, to which MIP applies, without change. Accordingly, in this case, for example, processing may be performed by regarding a predetermined MIP intra prediction mode as applying to the neighboring block to which MIP does not apply. For example, when MIP does not apply to the neighboring block, the MIP intra prediction mode of the corresponding block may be determined to be a specific MIP intra prediction mode value (e.g., 0, 1 or 2), generating an MIP MPM list.

Alternatively, as another example, a normal intra prediction mode of a neighboring block, to which MIP does not apply, may be mapped to an MIP intra prediction mode based on a mapping table to be used to configure an MIP MPM list. In this case, the mapping may be performed based on the block size type of the current block. For example, as the mapping table, a mapping table according to an embodiment shown in FIG. 13 may be used.

FIG. 13 shows an embodiment of a mapping table for mapping normal intra prediction modes of neighboring blocks to MIP intra prediction modes. As shown in FIG. 13, IntraPredModeY[xNbX][yNbX] indicates the intra prediction mode of the neighboring block (left neighboring block/top neighboring block). Here, the intra prediction mode of the neighboring block may be an intra prediction mode of a luma component (sample). A block size type MipSizeId indicates a block size type of the neighboring block or the current block. Numbers below block size type values 0, 1 and 2 indicate an MIP intra prediction mode, to which a normal intra prediction mode is mapped, in case of each block size type. Block size type 0 may indicate the case where a block has a 4×4 pixel size. Block size type 1 may indicate the case where a block has a 4×8, 8×4 or 8×8 pixel size. Block size type 2 may indicate the case where a block has a size greater than an 8×8 pixel size.

Figures 14, 15:
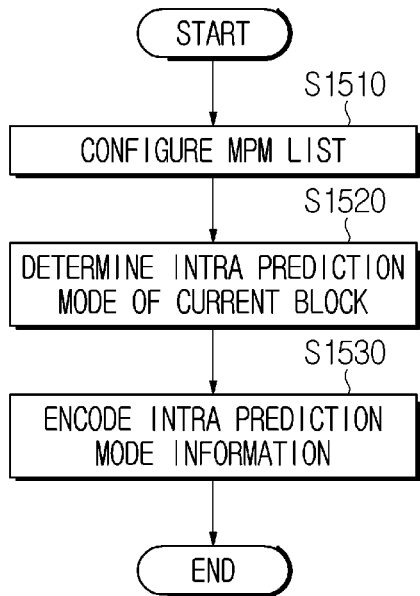
FIG. 14 is a view illustrating an MPM list configured in a predetermined MIP intra prediction mode according to an embodiment.
FIG. 15 is a flowchart illustrating a method of encoding an intra prediction mode using an MPM list according to an embodiment.

In an embodiment, the neighboring block (e.g., the left neighboring block/top neighboring block) may not be available because it is located outside a current picture or outside a current tile/slice or an MIP intra prediction mode not available for the current block may be applied according to the block size type even if MIP has been applied. In addition, a predefined MIP intra prediction mode may be used as the first candidate intra prediction mode, the second candidate intra prediction mode and a third candidate intra prediction mode. FIG. 14 shows a table illustrating an embodiment of a predetermined MIP intra prediction mode which may be used in this case according to the size of the current block. For example, when all MIP intra prediction information of the neighboring block is not available, an MIP MPM list may be generated based on the size of the current block according to the example of FIG. 14.

In an embodiment, the MIP intra prediction mode of the neighboring block may be obtained. In this case, when the MIP intra prediction mode of the left neighboring block is different from the MIP intra prediction mode of the top neighboring block, the MIP intra prediction mode of the left neighboring block may be set to the first candidate intra prediction mode. In addition, the MIP intra prediction mode of the top neighboring block may be set to the second candidate intra prediction mode. Thus, a first candidate (e.g., candMipModeList[0]) of the MIP MPM list may be set to the MIP intra prediction mode of the left neighboring block, and a second candidate (e.g., candMipModeList[1]) of the MIP MPM list may be set to the MIP intra prediction mode of the top neighboring block.

The order of intra prediction candidates in the MIP list may be changed. For example, the MIP intra prediction mode of the top neighboring block may be included as the first candidate (e.g., candMipModeList[0]) of the MIP MPM list, and the MIP intra prediction mode of the left neighboring block may be included as the second candidate (e.g., candMipModeList[1]) of the MIP MPL list.

As the third candidate intra prediction mode, a predetermined MIP intra prediction mode according to FIG. 14 may be used. For example, the third candidate intra prediction mode of FIG. 14 may be used as the second candidate (e.g., candMipModeList[2]) of the MIP MPM list.

In another embodiment, the third candidate intra prediction mode may be determined to be an MIP intra prediction mode which does not overlap the first candidate intra prediction mode and the second candidate intra prediction mode, which may be determined according to the order of MIP intra prediction modes shown in FIG. 14. For example, when the first candidate intra prediction mode of FIG. 14 is not used in the first and second candidates of the MIP MPM list, the first candidate intra prediction mode of FIG. 14 may be used as the third candidate (e.g., candMipModeList[2]) of the MIP MPM list. Otherwise, for example, when the second candidate intra prediction mode of FIG. 15 is not used in the first and second candidates of the MIP MPM list, the second candidate intra prediction mode of FIG. 14 may be used as the third candidate (e.g., candMipModeList[2]) of the MIP MPM list. Otherwise, the third candidate intra prediction mode of FIG. 13 may be used as the third candidate (e.g., candMipModeList[2]) of the MIP MPM list.

Alternatively, when the MIP intra prediction mode of the left neighboring block and the MIP intra prediction mode of the top neighboring block are the same, one of the MIP intra prediction mode of the left neighboring block and the MIP intra prediction mode of the top neighboring block may be included as the first candidate (e.g., candMipModeList[0]) of the MIP MPM list, and the second candidate (e.g., candMipModeList[1]) of the MIP MPM list and the third candidate (e.g., candMipModeList[2]) of the MIP MPM list may use predetermined MIP intra prediction modes shown in FIG. 15 as described above.

As described above, the MIP intra prediction mode of the current block may be derived based on the MIP MPM list. In this case, as described above, an MPM flag which may be included in the intra prediction mode information for MIP may be referred to as intra_mip_mpm_flag, an MPM index may be referred to as intra_mip_mpm_idx, and remaining intra prediction mode information may be referred to as intra_mip_mpm_remainder.

Determination of Intra Prediction Mode Using MPM List

The intra prediction mode signaling procedure of the encoding apparatus and the intra prediction mode determination procedure of the decoding apparatus may be, for example, performed as follows.

FIG. 15 is a flowchart illustrating a method of encoding an intra prediction mode using an MPM list. The encoding apparatus may configure an MPM list for a current block as described above (S1510).

Next, the encoding apparatus may determine the intra prediction mode of the current block (S1520). The encoding apparatus may perform prediction based on various intra prediction modes, and determine an optimal intra prediction mode based on rate-distortion optimization (RDO). In an embodiment, the encoding apparatus may determine the optimal intra prediction mode using only the MPM candidates configured in the MPM list, or may determine the optimal intra prediction mode by further using the remaining intra prediction mode as well as the MPM candidates configured in the MPM list. For example, if the intra prediction type of the current block is a specific type (e.g., LIP, MRL, or ISP) other than the normal intra prediction type, the encoding apparatus may determine the optimal intra prediction mode in consideration of only the MPM candidates as the intra prediction mode candidates for the current block. In this case, the intra prediction mode of the current block may be determined only from the MPM candidates, and, in this case, the mpm flag may not be encoded/signaled. In this case, the decoding apparatus may estimate that the mpm flag is 1 without separately receiving the mpm flag.

The encoding apparatus may encode and output intra prediction mode information in the form of a bitstream (S1530). In an embodiment, the encoding apparatus may signal whether the intra prediction mode of the current block is an intra planar mode by encoding information (e.g., intra_luma_not_planar_flag) specifying whether the intra prediction mode of the current block is an intra planar mode. The encoding apparatus may set the value of intra_luma_n- ot_planar_flag to a first value (e.g., 0), when the intra prediction mode of the current block is an intra planar mode. Meanwhile, the encoding apparatus may set the value of intra_luma_not_planar_flag to a second value (e.g., 1) when the intra prediction mode of the current block is not an intra planar mode.

Meanwhile, the encoding apparatus may determine and signal an intra prediction mode according to whether Block-based Delta Pulse Code Modulation (BDPCM) applies to the current block and an application direction, when the intra prediction mode of the current block is not an intra planar mode. In an embodiment, the encoding apparatus may determine an intra prediction mode according to the BDPCM application direction when BDPCM applies to the current block. For example, the encoding apparatus may determine the intra prediction mode to be a horizontal or vertical mode in the same direction based on the BDPCM application direction being any one of a horizontal direction or a vertical direction. In addition, in this case, the encoding apparatus may signal the intra prediction mode of the current block by encoding and signaling information (intra_bdpcm_flag) specifying whether BDPCM applies to the current block and information (intra_bdpcm_dir_flag) specifying the BDPCM application direction. In this case, signaling of the mpm flag may be skipped.

Meanwhile, when the prediction mode of the current block is not an intra planar mode and BDPCM does not apply, the encoding apparatus may encode intra prediction mode information including the above-described mpm flag (e.g., intra_luma_mpm_flag), the mpm index (e.g., intra_luma_mpm_idx) and/or the remaining intra prediction mode information (e.g., intra_luma_mpm_remainder) to signal an intra prediction mode. Generally, the mpm index and the remaining intra prediction mode information are mutually alternative and may not be simultaneously signaled in specifying an intra prediction mode for one block. That is, an mpm flag value 1 and an mpm index may be signaled together or an mpm flag value 0 and remaining intra prediction mode information may be signaled together. However, as described above, when a specific intra prediction type applies to the current block, the mpm flag may not be signaled and only the mpm index may be signaled. That is, in this case, the intra prediction mode information may include only the mpm index.

Meanwhile, generally, when the intra prediction mode of the current block is one of the MPM candidates in the MPM list, the encoding apparatus may generate an mpm index (e.g., intra_luma_mpm_idx) specifying one of the MPM candidates. If the intra prediction mode of the current block is not present in the MPM list, remaining intra prediction mode information (e.g., intra_luma_mpm_remainder) specifying the same mode as the intra prediction mode of the current block among the remaining intra prediction modes which are not included in the MPM list may be generated. For example, when the intra prediction mode of the current block (e.g., IntraPredModeY) is encoded into intra_luma_mpm_remainder, the encoding apparatus may first subtract 1 from IntraPredModeY, align the intra prediction modes belonging to the MPM list in descending order in the order of the magnitude of the intra prediction mode value, and determine that the value of the IntraPredModeY determined by decreasing the value of IntraPredModeY by one when the value of IntraPredModeY-1 is less than the value of candModeList[ ] is intra_luma_mpm_remainder, while performing comparison with the value of IntraPredModeY from candModeList[0] to candModeList[4].

Meanwhile, when the intra prediction mode of the current block is an MIP mode, the encoding apparatus may generate an MPM list for the MIP mode and encode the current block as described above. In this case, the MPM encoding information for the MIP mode may be signaled. In this case, the MPM flag may be signaled as intra_mip_mpm_flag, the MPM index may be signaled as intra_mip_mpm_idx, the remaining intra prediction mode information may be signaled as intra_mip_mpm_remainder.

Figure 16:
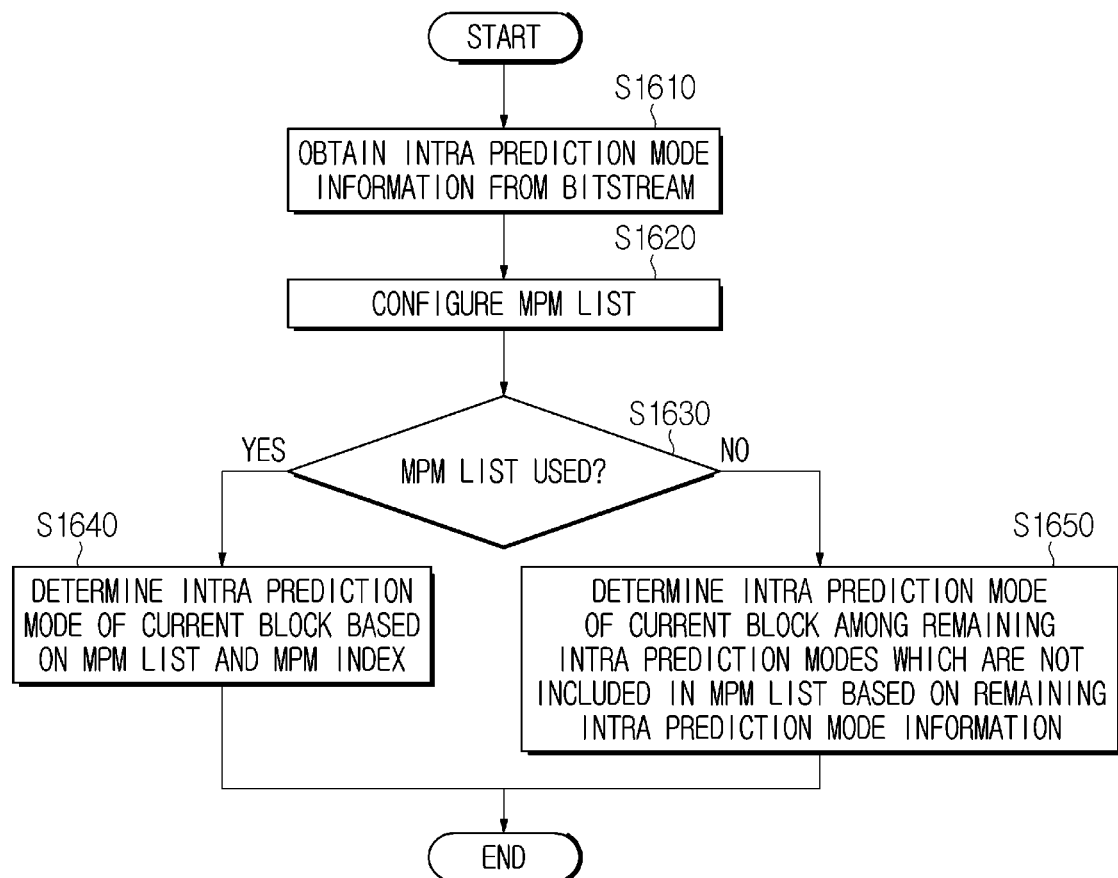
FIG. 16 is a flowchart illustrating a method of performing decoding using an MPM list by a decoding apparatus according to an embodiment.

FIG. 16 is a flowchart illustrating a method of performing decoding using an MPM list by a decoding apparatus according to an embodiment. The decoding apparatus may determine an intra prediction mode in correspondence with intra prediction mode information determined and signaled by the encoding apparatus.

Referring to FIG. 16, the decoding apparatus may obtain intra prediction mode information from a bitstream (S1610). The intra prediction mode information may include at least one of an mpm flag, an mpm index, or remaining intra prediction mode as described above.

The decoding apparatus may configure an MPM list (S1620). The MPM list may be configured to be the same as the MPM list configured by the encoding apparatus. That is, the MPM list may include the intra prediction mode of the neighboring block, and further include specific intra prediction modes according to a predetermined method.

In an embodiment, the decoding apparatus may determine whether the intra prediction mode of the current block is an intra planar mode based on information (e.g., intra_luma_not_planar_flag) specifying whether the intra prediction mode of the current block is not an intra planar mode. When the value of intra_luma_not_planar_flag is a first value (e.g., 0), the decoding apparatus may determine that the intra prediction mode of the current block is an intra planar mode. Meanwhile, when the value of intra_luma_not_planar_flag is a second value (e.g., 1), the decoding apparatus may determine that the intra prediction mode of the current block is not an intra planar mode.

Meanwhile, when the intra prediction mode of the current block is not an intra planar mode, the decoding apparatus may determine an intra prediction mode according to whether Block-based Delta Pulse Code Modulation (BDPCM) applies to the current block and the application direction. In an embodiment, when information (intra_bdpcm_flag) specifying whether BDPCM applies to the current block obtained from the bitstream specifies that BDPCM applies, the decoding apparatus may determine at least one BDPCM application direction of a horizontal direction or a vertical direction based on information (intra_bdpcm_dir_flag) specifying the application direction of the BDPCM obtained from the bitstream. In addition, in the same direction as the determined BDPCM application direction, the intra prediction mode may be determined to be a horizontal or vertical mode.

Meanwhile, when the prediction mode of the current block is not an intra planar mode and BDPCM does not apply, the decoding apparatus may generate an MPM list using the above-described method to determine the intra prediction mode. For example, the MPM list may be determined based on the intra prediction mode of the neighboring block of the current block. The decoding apparatus may determine the MPM list based on the intra prediction modes of the top neighboring block and left neighboring block of the current block. For example, in an embodiment, the decoding apparatus may determine the MPM list based on the first intra prediction candidate determined based on the intra prediction mode of the left neighboring block and the second intra prediction candidate determined based on the intra prediction mode of the top neighboring block.

The decoding apparatus may determine whether to determine the intra prediction mode of the current block using the MPM list (S1630). For example, when the value of the mpm flag is 1, the decoding apparatus may derive a candidate specified by the mpm index among the MPM candidates in the MPM list as the intra prediction mode of the current block. For example, the decoding apparatus may determine the intra prediction mode of the current block according to the value of intra_luma_mpm_idx which is the mpm index. For example, the decoding apparatus may determine candModeList[intra_luma_mpm_idx] to be the intra prediction mode of the current block.

As another example, when the value of the mpm flag is 0, the decoding apparatus may derive an intra prediction mode specified by the remaining intra prediction mode information among the remaining intra prediction mode which are not included in the MPM list as the intra prediction mode of the current block (S1640).

For example, the decoding apparatus may determine the intra prediction mode (e.g., IntraPredModeY) of the current block based on the remaining intra prediction mode information (e.g., intra_luma_mpm_remainder) specifying the intra prediction mode of the current block. For example, the decoding apparatus may set the value of IntraPredModeY to intra_luma_mpm_remainder+1. Thereafter, the decoding apparatus may align intra prediction modes belonging to the MPM list in ascending order in the order of the magnitude of the intra prediction mode value, and determine the value of IntraPredModeY specifying the intra prediction mode of the current block by increasing the value of IntraPredModeY by one when the value of IntraPredModeY is less than the value of candModeList[ ] while performing comparison with the value of IntraPredModeY from candModeList[0] to candModeList[4].

Meanwhile, as another example, when the intra prediction type of the current block is a specific type (e.g., LIP, MRL or ISP), the decoding apparatus may derive a candidate specified by the mpm index in the MPM list as the intra prediction mode of the current block, without checking the mpm flag.

Meanwhile, when the intra prediction mode of the current block is an MIP mode, the decoding apparatus may generate an MPM list for an MIP to decode the current block as described above. In this case, MPM encoding information of the MIP mode may be obtained through a bitstream. In this case, the MPM flag may be obtained through intra_mip_mpm_flag, the MPM index may be obtained using intra_mip_mpm_idx, and the remaining intra prediction mode information may be obtained using intra_mip_mpm_remainder.

Mapping Problems Between MIP Intra Prediction Mode and Normal Intra Prediction Mode As described above, in order to determine the MIP mode or the intra prediction mode of the current block, an MPM list for a normal intra prediction mode or an MPM list for MIP may be generated based on information on neighboring blocks. In this case, the neighboring blocks may include the left neighboring block and top neighboring block of the current block. Here, the normal intra prediction mode means an intra prediction mode other than the MIP mode. For example, the normal intra prediction mode may mean an intra planar mode and an intra DC mode which are a non-directional intra prediction mode, and a directional intra prediction mode.

When the MIP mode applies to the current block but an intra prediction mode (normal intra prediction mode) other than the MIP mode applies to the neighboring block, the intra prediction mode of the neighboring block needs to be mapped to the MIP mode to generate the MPM list of the current block using the prediction information of the neighboring block. In addition, when the normal intra prediction mode applies to the current block but the MIP mode applies to the neighboring block, the MIP mode of the neighboring block needs to be mapped to the normal intra prediction mode to generate the MPM list of the current block using the prediction information of the neighboring block.

However, the MIP modes has a problem in that it is difficult to map the normal intra prediction mode and the MIP mode in a one-to-one correspondence because the MIP mode may have various numbers of prediction modes according to the size of the luma block as follows.

TABLE 3

| Luma block size | Number of MIP modes |
|---|---|
| 4 × 4 luma block | 35 MIP modes |
| 4 × 8, 8 × 4, 8 × 8 luma block | 19 MIP modes |
| Other luma blocks | 11 MIP modes |

Figure 17:
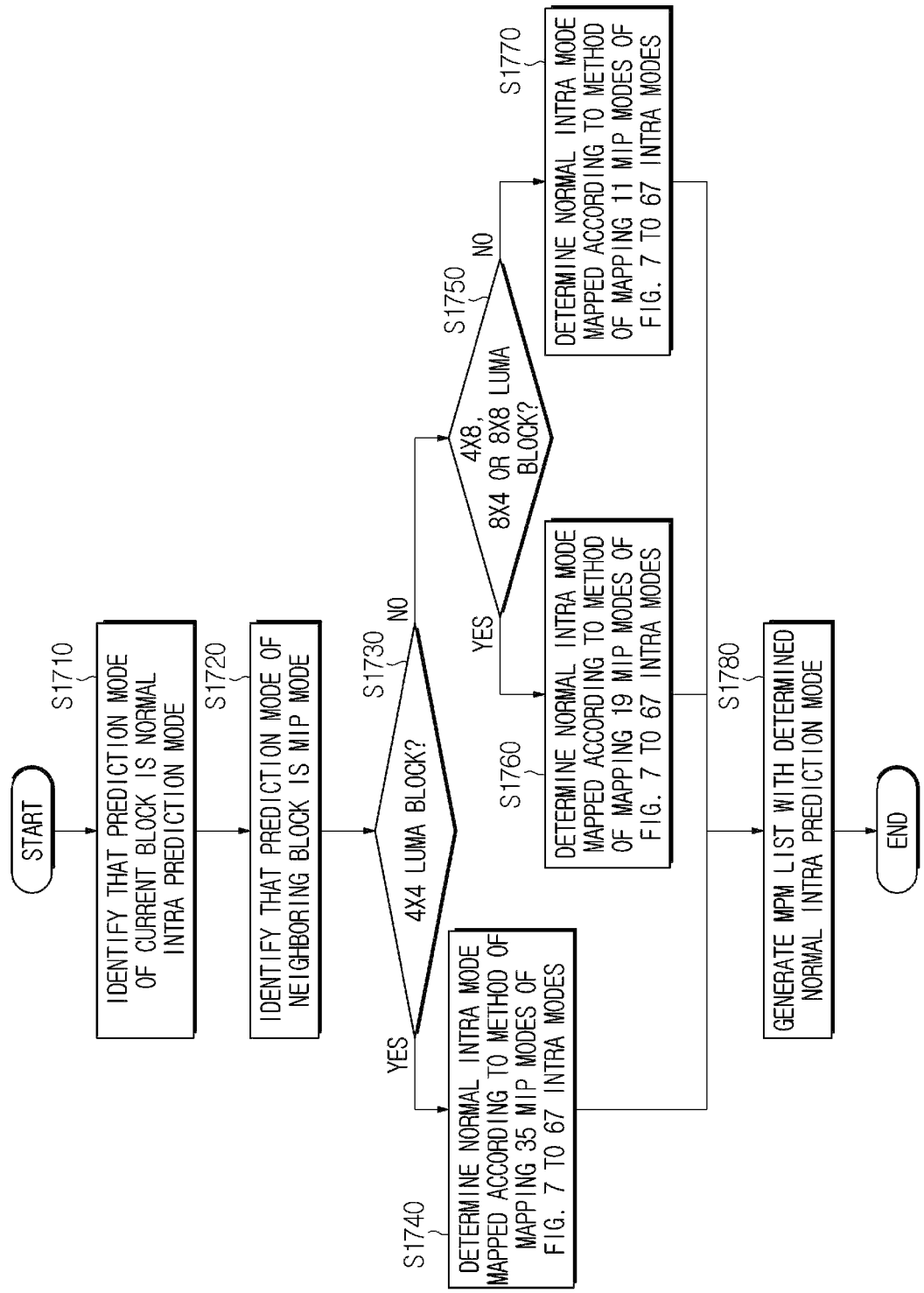
FIG. 17 is a flowchart illustrating a method of generating an MPM list using a mapping method according to an embodiment.

Since the number of normal intra prediction modes and the number of MIP modes are different, in order to interpolate and map them, mapping of the MIP mode and the normal intra prediction mode may be performed through the mapping table shown in FIGS. 7 and 13. For example, when neighboring bocks are referenced to generate the MPM list of the current block encoded in the normal intra mode, if the intra prediction mode of the neighboring block is an MIP mode, in order to map the MIP mode of the neighboring block to the intra prediction mode, the MPM list shall be generated as shown in FIG. 17. More specifically, in the encoding and decoding process, the encoding apparatus and the decoding apparatus may identify that the prediction mode of the current block is an normal intra prediction mode (S1710), and identify that the prediction mode of the neighboring block is an MIP mode (S1720). The encoding apparatus and the decoding apparatus may check whether the neighboring block is a 4×4 luma block when the prediction mode of the neighboring block is an MIP mode (S1730). The encoding apparatus and the decoding apparatus may determine a normal intra prediction mode corresponding to the MIP mode of the neighboring block according to the method of mapping 35 MIP modes of FIGS. 7 to 67 intra modes (S1740), when the neighboring block is a 4×4 luma block. When the neighboring block is not a 4×4 luma block, the encoding apparatus and the decoding apparatus may check whether the neighboring block is a 4×8, 8×4 or 8×8 luma block (S1750). When the neighboring block is a 4×8, 8×4 or 8×8 luma block, the encoding apparatus and the decoding apparatus may determine a normal intra prediction mode corresponding to the MIP mode of the neighboring block according to the method of mapping 19 MIP modes of FIGS. 7 to 67 intra modes (S1760). Alternatively, when the neighboring block is not a 4×8, 8×4 or 8×8 luma block, the encoding apparatus and the decoding apparatus may determine a normal intra prediction mode corresponding to the MIP mode of the neighboring block according to the method of mapping 11 MIP modes of FIGS. 7 to 67 intra modes (S1770). Finally, the encoding apparatus and the decoding apparatus may generate the MPM list of the current block with the determined normal intra prediction mode according to the above-described method (S1780).

Figure 18:
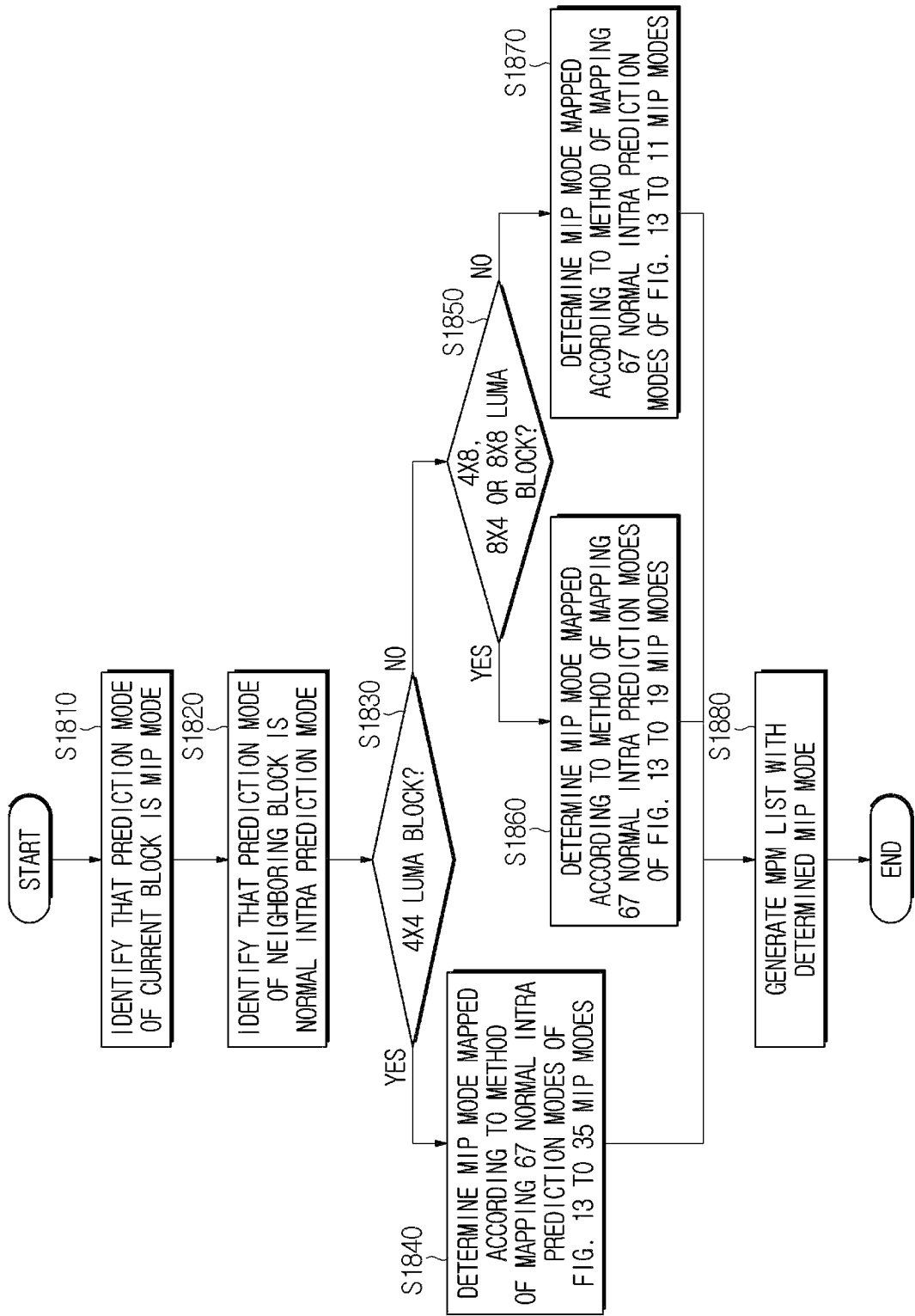
FIG. 18 is a flowchart illustrating a method of generating an MPM list using a mapping method according to another embodiment.

In a similar manner, when the neighboring block is referenced to generate the MPM list of the current block encoded in the MIP mode, if the intra prediction mode of the neighboring block is a normal intra prediction mode, steps S1810 to S1880 shall be performed as shown in FIG. 18 to map the intra prediction mode of the neighboring block to the MIP mode.

However, when such mapping is performed, as correlation between the MIP mode and the intra prediction mode occurs, comparison between the sizes of the current block and the neighboring block need to be performed, and an additional memory for storing such a mapping table is required.

Mapping of MIP Intra Prediction Mode to Normal Intra Prediction Mode

Hereinafter, a mapping method according to an embodiment for reducing complexity of a mapping algorithm and saving a memory for storing a mapping table by removing correlation between the MIP mode and the intra prediction mode and the block size will be described.

The encoding apparatus and the decoding apparatus according to an embodiment may determine the MIP mode to be a predetermined intra prediction mode without using the block size and the mapping table, when the MIP mode is mapped to the normal intra prediction mode.

For example, the encoding apparatus and the decoding apparatus according to an embodiment may map all MIP modes to an intra planar mode when the MIP mode is converted into an intra prediction mode.

Alternatively, the encoding apparatus and the decoding apparatus according to an embodiment may map all MIP modes to an intra DC mode when the MIP mode is converted into an intra prediction mode.

Alternatively, the encoding apparatus and the decoding apparatus according to an embodiment may map all MIP modes to an intra vertical mode when the MIP mode is converted into an intra prediction mode.

Alternatively, the encoding apparatus and the decoding apparatus according to an embodiment may map all MIP modes to an intra horizontal mode when the MIP mode is converted into an intra prediction mode.

In an embodiment, in order to determine the intra prediction mode of the current block, when the intra prediction mode of the neighboring block is searched to generate the MPM list, if MIP prediction applies to the neighboring block, the intra prediction mode of the neighboring block may be derived as an intra planar mode, generating a current block MPM list.

Meanwhile, in the case where the current block (or coding unit) includes a luma block and a chroma block, upon configuring the intra prediction mode of the chroma block, if MIP prediction applies to the luma block corresponding to the position of the chroma block, the intra prediction mode specified by the DM (direct mode, the luma block intra prediction mode corresponding to the chroma block is used) of the chroma block may be derived as an intra planar mode.

Figure 19:
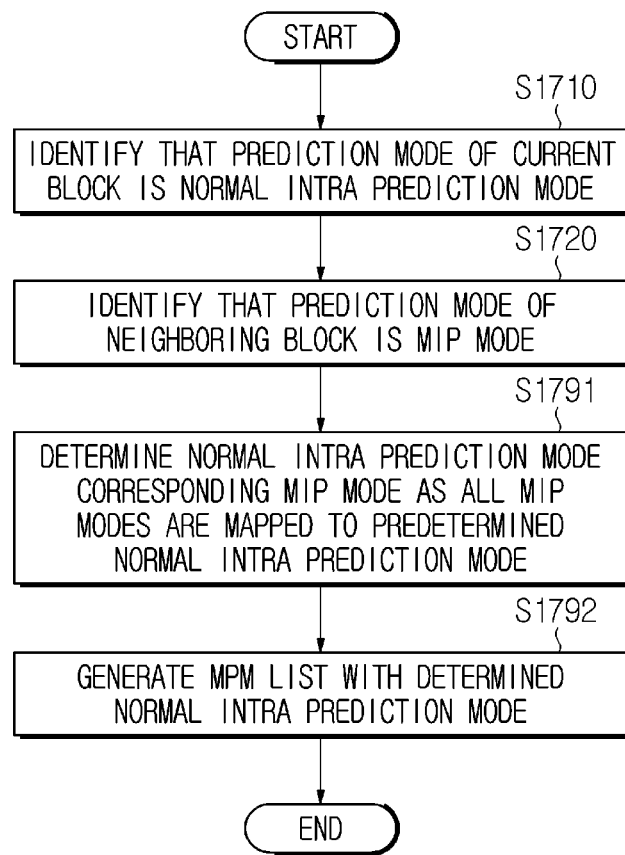
FIG. 19 is a flowchart illustrating a method of generating an MPM list using a simplified mapping method according to an embodiment.

By mapping the MIP mode to the intra prediction mode, the encoding apparatus or the decoding apparatus may simply determine that all MIP modes are a predetermined normal intra prediction mode and generate an MPM list based on the corresponding normal intra prediction mode, in generating the MPM list when the current block is encoded or decoded in a normal intra mode. Therefore, the MPM list generation step described with reference to FIG. 17 may be simplified as shown in FIG. 19. Referring to FIG. 19, in the MPM list generation step described with respect to FIG. 17, it can be seen that steps S1730 to S1780 are simplified to step S1791 of determining a normal intra prediction mode corresponding to the MIP mode as all the MIP modes are mapped to the predetermined normal intra prediction mode and step S1792 of generating an MPM list with the determined normal intra prediction mode. Here, the predetermined normal intra prediction mode may be any one of an intra planar mode, an intra DC mode, an intra vertical mode and an intra horizontal mode.

Similarly, even if the above-described intra prediction mode for the chroma block is determined, when the luma block corresponding to the chroma block is an MIP mode, the intra prediction mode corresponding to the luma block may be determined to be a predetermined normal intra prediction mode, without performing mapping according to the size.

Figure 20:
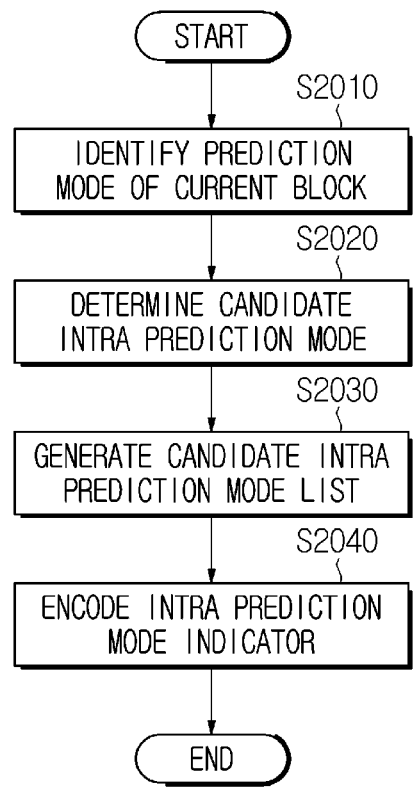
FIG. 20 is a flowchart illustrating a method of generating an MPM list using a simplified mapping method by an encoding apparatus according to an embodiment.

Hereinafter, an image encoding method performed by an encoding apparatus according to an embodiment will be described with reference to FIG. 20. The encoding apparatus according to an embodiment may include a memory and at least one processor and perform the following encoding method by the at least one processor.

The encoding apparatus according to an embodiment may identify a prediction mode of a current block (S2010). When the prediction mode of the current block is an intra prediction mode, the encoding apparatus may determine a candidate intra prediction mode based on a prediction mode of a neighboring block located around the current block (S2020). The candidate intra prediction mode may include a first candidate intra prediction mode and a second candidate intra prediction mode. The first candidate intra prediction mode may be determined based on a prediction mode of a first neighboring block located around the current block, and the second candidate intra prediction mode may be determined based on a prediction mode of a second neighboring block located around the current block. Here, the first candidate intra prediction mode may be the above-described first intra prediction candidate, and the second candidate intra prediction mode may be the above-described second intra prediction candidate. For example, the encoding apparatus may determine the first candidate intra prediction mode (e.g., candIntraPredModeA) based on the intra prediction mode of the left neighboring block and determine the second candidate intra prediction mode (e.g., candIntraPredModeB) based on the intra prediction mode of the top neighboring block.

In this case, when the prediction mode of the neighboring block is an MIP mode, the encoding apparatus may determine the candidate intra prediction mode of the corresponding neighboring block to be a predetermined intra prediction mode. Here, the predetermined intra prediction mode may be any one of an intra planar mode, an intra DC mode, an intra horizontal mode and an intra vertical mode. For example, when the intra prediction mode of the left neighboring block is an MIP mode, the encoding apparatus may determine the first candidate intra prediction mode (e.g., candIntraPredModeA) to be any one of an intra planar mode, an intra DC mode, an intra horizontal mode and an intra vertical mode. Alternatively, when the intra prediction mode of the top neighboring block is an MIP mode, the encoding apparatus may determine the second candidate intra prediction mode (e.g., candIntraPredModeB) to be any one of an intra planar mode, an intra DC mode, an intra horizontal mode and an intra vertical mode.

Next, the encoding apparatus may generate a candidate intra prediction mode list of the current block based on the candidate intra prediction mode (S2030). The candidate intra prediction mode list may be the above-described MPM list. For example, the encoding apparatus may generate the candidate intra prediction mode list based on the first candidate intra prediction mode and the second candidate intra prediction mode as described above. In this case, when the both the prediction mode of the first neighboring block and the prediction mode of the second neighboring block are an MIP mode, the encoding apparatus may determine that the candidate intra prediction mode list includes a predetermined candidate intra prediction mode. Here, the predetermined candidate intra prediction mode may be at least one of a DC mode or a vertical mode.

Next, the encoding apparatus may encode an intra prediction mode indicator indicating the intra prediction mode of the current block based on the candidate intra prediction mode list (S2040). Here, the intra prediction mode indicator may include an mpm flag signaled in the form of an intra_luma_mpm_flag syntax element, an mpm index signaled in the form of an mpm_idx or intra_luma_mpm_idx syntax element or remaining intra prediction mode information signaled in the form of an rem_intra_luma_pred_mode or intra_luma_mpm_remainder syntax element. The encoding apparatus may generate a bitstream by encoding the intra prediction mode indicator and transmit it to the decoding apparatus.

Hereinafter, an image decoding method performed by a decoding apparatus according to an embodiment will be described with reference to FIG. 21. The decoding apparatus according to an embodiment may include a memory and at least one processor and perform the following decoding method by the at least one processor.

First, the decoding apparatus according to an embodiment may identify a prediction mode of a current block (S2110). When the prediction mode of the current block is an intra prediction mode, the decoding apparatus may determine a candidate intra prediction mode for the current block based on a prediction mode of a neighboring block located around the current block (S2120).

When the prediction mode of the neighboring block is an MIP mode, the decoding apparatus may determine the candidate intra prediction mode to be a predetermined intra prediction mode. Here, the predetermined intra prediction mode may be any one of an intra planar mode, an intra DC mode, an intra horizontal mode and an intra vertical mode.

The decoding apparatus may determine whether the prediction mode of the neighboring block is an MIP mode based on an MIP mode indicator for the neighboring block. The MIP mode indicator may be the above-described MIP flag (e.g., intra_mip_flag), and the decoding apparatus may obtain the MIP mode indicator from a bitstream.

The candidate intra prediction mode may include a first candidate intra prediction mode and a second candidate intra prediction mode. In this case, the first candidate intra prediction mode may be determined based on a prediction mode of a first neighboring block located around the current block, and the second candidate intra prediction mode may be determined based on a prediction mode of a second neighboring block located around the current block.

Here, the first candidate intra prediction mode may be the above-described first intra prediction candidate, and the second candidate intra prediction mode may be the above-described second intra prediction candidate. For example, the decoding apparatus may determine the first candidate intra prediction mode (e.g., candIntraPredModeA) based on the intra prediction mode of the left neighboring block and determine the second candidate intra prediction mode (e.g., candIntraPredModeB) based on the intra prediction mode of the top neighboring block.

For example, when the intra prediction mode of the left neighboring block is an MIP mode, the decoding apparatus may determine the first candidate intra prediction mode (e.g., candIntraPredModeA) to be any one of an intra planar mode, an intra DC mode, an intra horizontal mode and an intra vertical mode. Alternatively, when the intra prediction mode of the top neighboring block is an MIP mode, the decoding apparatus may determine the second candidate intra prediction mode (e.g., candIntraPredModeB) to be any one of an intra planar mode, an intra DC mode, an intra horizontal mode and an intra vertical mode.

In addition, the decoding apparatus may generate an candidate intra prediction mode list of the current block based on the candidate intra prediction mode (S2130). The candidate intra prediction mode list may be the above-described MPM list. For example, the decoding apparatus may generate a candidate intra prediction mode list based on the first candidate intra prediction mode and the second candidate intra prediction mode as described above. In this case, when the both the prediction mode of the first neighboring block and the prediction mode of the second neighboring block are an MIP mode, the decoding apparatus may determine that the candidate intra prediction mode list includes a predetermined candidate intra prediction mode. Here, the predetermined candidate intra prediction mode may be at least one of a DC mode or a vertical mode.

In addition, when the first candidate intra prediction mode and the second candidate intra prediction mode are the same and the first candidate intra prediction mode is an intra prediction mode having a value greater than a prediction mode value specifying a DC mode, the decoding apparatus may generate a candidate intra prediction mode list including the value of the first candidate intra prediction mode.

In addition, when the prediction mode of the first neighboring block is an MIP mode, the first candidate intra prediction mode and the second candidate intra prediction mode are different from each other and the second candidate intra prediction mode is an intra prediction mode having a value greater than a prediction mode value indicating a DC mode, the decoding apparatus may generate a candidate intra prediction mode list including the second candidate intra prediction mode.

In addition, the decoding apparatus may determine the intra prediction mode of the current block based on the candidate intra prediction mode list (S2140). The decoding apparatus may determine any one of the candidate intra prediction modes included in the candidate intra prediction mode list to be the intra prediction mode of the current block based on the intra prediction mode indicator obtained from the bitstream. For example, the intra prediction mode indicator may be the above-described mpm index, and may be signaled in the form of an mpm_idx or intra_luma_mpm_idx syntax element through the bitstream.

In addition, the encoding apparatus according to an embodiment may encode the intra prediction mode of the chroma block according to mapping of the above-described MIP mode. The encoding apparatus according to an embodiment may use a DM mode to signal the intra prediction mode of the chroma block. In this case, the encoding apparatus may determine an intra prediction mode applied according to the DM mode to be an intra prediction mode specified by a reference mode. Here, the reference mode may be determined based on the prediction mode of a luma block corresponding to the chroma block, and may be identified by a parameter of lumaIntraPredMode or IntraPredModeY.

For example, the encoding apparatus may determine the intra prediction mode of the luma block corresponding to the chroma block to be the reference mode. Accordingly, the encoding apparatus may determine the intra prediction mode of the chroma block determined in the DM mode to be the intra prediction mode of the luma block.

In this case, when the luma block is a luma block to which the MIP mode applies, the encoding apparatus may determine the reference mode to be a planar mode instead of the MIP mode. Therefore, the encoding apparatus may determine the intra prediction mode of the chroma block, which has been determined to be the DM mode, to be an intra planar mode.

Alternatively, when the MIP mode does not apply to the luma block, the encoding apparatus may determine the reference mode according to the prediction mode of the luma block. For example, when the luma block is predicted in a predetermined mode, the encoding apparatus may determine the reference mode to be an intra DC mode. Here, the predetermined mode may include an IBC mode or the other mode. Therefore, the encoding apparatus may determine the intra prediction mode of the chroma block, which has been determined to be the DM mode, to be an intra DC mode.

In addition, the encoding apparatus may encode the intra prediction mode of the chroma block based on the reference mode. For example, the encoding apparatus may select an intra planar mode as an optimal prediction mode for encoding the chroma block, and encode information indicating that the intra prediction mode of the chroma block is an intra prediction mode identified according to the DM mode, when the prediction mode of the luma block corresponding to the chroma block is an MIP mode.

In addition, in correspondence with the encoding method, the decoding apparatus according to an embodiment may determine an intra prediction mode of a chroma block according to mapping of the above-described MIP mode. The decoding apparatus according to an embodiment may determine a reference mode for determining the intra prediction mode of the chroma block based on a prediction mode of a luma block corresponding to the chroma block. Here, the reference mode may be identified by a parameter of lumaIntraPredMode or IntraPredModeY.

In this case, when the luma block corresponding to the chroma block is a luma block to which the MIP mode applies, the decoding apparatus may determine the reference mode to be a planar mode. Therefore, the decoding apparatus may determine the intra prediction mode of the chroma block, which has been determined to be the DM mode, to be an intra planar mode.

Alternatively, when the MIP mode does not apply to the luma block, the decoding apparatus may determine the reference mode according to the prediction mode of the luma block. For example, when the luma block is predicted in an IBC mode or the other predetermined mode, the decoding apparatus may determine the reference mode to be an intra DC mode. Therefore, the decoding apparatus may determine the intra prediction mode of the chroma block, which has been determined to be the DM mode, to be an intra DC mode.

Alternatively, when the MIP mode does not apply to the luma block and the luma block is not predicted in the IBC mode or the other predetermined mode, the decoding apparatus may determine the reference mode to be the intra prediction mode of the luma block. Therefore, the decoding apparatus may determine the intra prediction mode of the chroma block, which has been determined to be the DM mode, to be the intra prediction mode of the luma block.

In addition, the decoding apparatus may determine the intra prediction mode of the chroma block based on the reference mode. For example, when the intra prediction mode of the chroma mode is a DM mode, the decoding apparatus may determine the intra prediction mode of the chroma block to be the intra prediction mode corresponding to the reference mode.

Therefore, even if the prediction mode of the luma block or the neighboring block referenced when the current block is encoded or decoded in a normal intra mode is the MIP mode, the encoding apparatus and the decoding apparatus does not need to compare the sizes of the current blocks or the neighboring blocks, thereby reducing computational complexity. Furthermore, since the mapping table for mapping does not need to be used, it is possible to increase memory space efficiency.

Figures 21, 22:
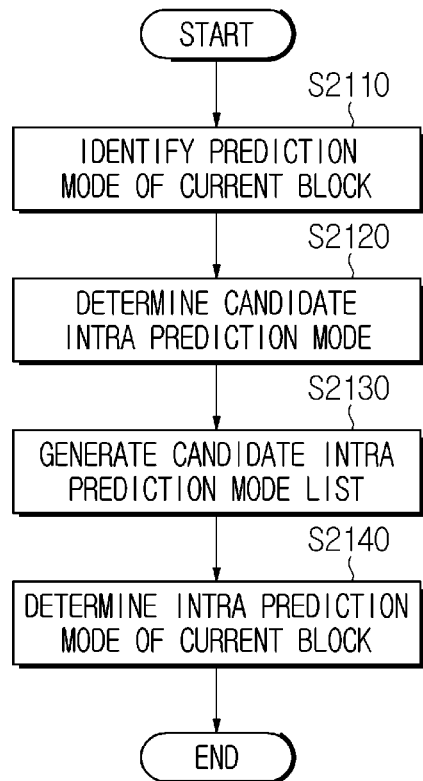
FIG. 21 is a flowchart illustrating a method of generating an MPM list using a simplified mapping method by a decoding apparatus according to an embodiment.
FIG. 22 is a view illustrating coding performance data using the simplified mapping method of FIG. 19.

FIG. 22 shows experimental data showing an encoding rate when generating the MPM list of the current block by mapping all MIP modes to an intra planar mode according to the mapping method of FIG. 19 when the MIP mode of the neighboring block is converted into an intra prediction mode, compared to the method using the mapping table shown in FIG. 17. As shown in FIG. 22, it can be seen that there is no difference in the encoding rate. That is, by applying the above methods, it is possible to reduce algorithm complexity while minimizing encoding loss and to reduce usage of the memory for the mapping table.

Mapping of Normal Intra Prediction Mode to MIP Intra Prediction Mode

Hereinafter, a mapping method according to another embodiment of reducing complexity of a mapping algorithm and saving a memory for storing the mapping table by removing correlation between an MIP mode and an intra prediction mode and a block size will be described.

The encoding apparatus and the decoding apparatus according to an embodiment may determine all normal intra prediction modes to be a predetermined MIP mode without using the block size and the mapping table, when the normal intra prediction mode is mapped to the MIP mode.

For example, the encoding apparatus and the decoding apparatus according to an embodiment may map all normal intra prediction modes to MIP mode #0 when the normal intra prediction mode is converted into an MIP mode.

Alternatively, the encoding apparatus and the decoding apparatus according to an embodiment may map all normal intra prediction modes to MIP mode #1 when the normal intra prediction mode is converted into an MIP mode.

Alternatively, the encoding apparatus and the decoding apparatus according to an embodiment may map all normal intra prediction modes to MIP mode #3 when the normal intra prediction mode is converted into an MIP mode.

Alternatively, the encoding apparatus and the decoding apparatus according to an embodiment may map all normal intra prediction modes to an MIP mode having a most probable selection rate in the encoding or decoding process when the normal intra prediction mode is converted into an MIP mode.

Figures 23, 24:
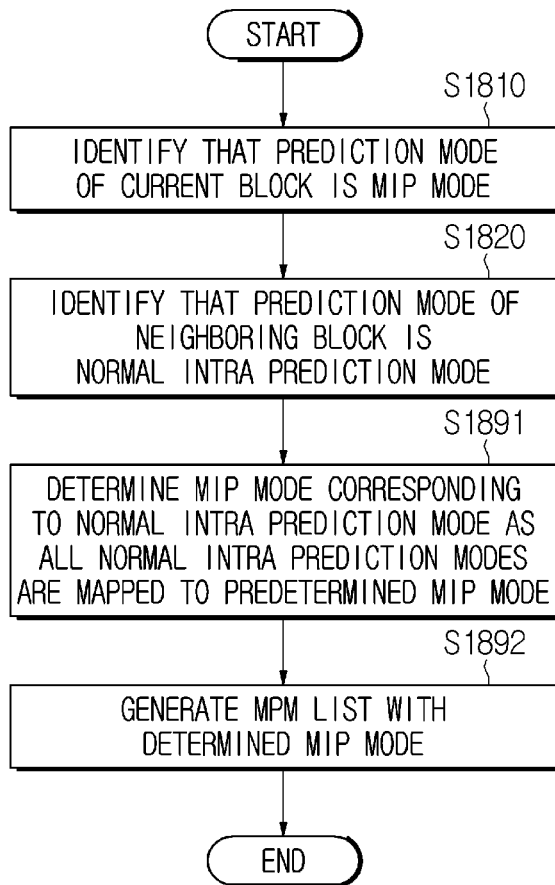
FIG. 23 is a flowchart illustrating a method of generating an MPM list using a simplified mapping method according to another embodiment.
FIG. 24 is a view illustrating coding performance data using the simplified mapping method of FIG. 23.

By mapping the MIP mode to the intra prediction mode, the encoding apparatus or the decoding apparatus may simply determine all normal intra prediction modes to be a predetermined MIP mode in generating an MPM list when the current block is encoded or decoded in the MIP, and generate an MPM list based on the corresponding MIP mode. Therefore, the MPM list generation step described with reference to FIG. 18 may be simplified as shown in FIG. 23. Referring to FIG. 23, in the MPM list generation step described with reference to FIG. 18, it can be seen that steps S1830 to S1880 are simplified to step S1891 of determining the MIP mode corresponding to the normal intra prediction mode as all normal intra prediction modes are mapped to a predetermined MIP mode (S1891) and step S1892 of generating an MPM list with the determined MIP mode (S1892). Here, the predetermined MIP mode may be any one of #0, #1, #3 and an MIP mode having a most probable selection rate in the encoding or decoding process.

FIG. 24 shows experimental data showing an encoding rate when generating the MPM list for the MIP mode of the current block by mapping all normal intra prediction modes to MIP mode #0 according to the above-described mapping method when the normal intra prediction mode of the neighboring block is converted into the MIP mode, compared to an encoding rate when generating the MPM list described with reference to FIG. 18. As shown in FIG. 24, it can be seen that there is no difference in the encoding rate. That is, by applying the above methods, it is possible to reduce algorithm complexity while minimizing encoding loss and to reduce usage of the memory for the mapping table.

Alternatively, the encoding apparatus and the decoding apparatus according to an embodiment may convert the normal intra prediction mode into the MIP mode using the simplified mapping table as shown in Table 4 below.

TABLE 4

| Intra mode | MipSizeId | | |
|---|---|---|---|
| | 0 | 1 | 2 |
| 0-66 | 17 | 0 | 1 |

For example, the encoding apparatus and the decoding apparatus according to an embodiment may map all normal intra prediction modes to MIP mode #17, 0 or 1 according to the size (MipSizeId) of the current block.

As described above, a size 0 of the current block may mean a 4×4 luma bock, a size 1 of the current block may mean a 4×8, 8×4 or 8×8 luma block, and a size 2 of the current block may mean a more than 8×8 luma block.

Alternatively, the encoding apparatus and the decoding apparatus according to an embodiment may convert the normal intra prediction mode into an MIP mode using the simplified mapping table as shown in Table 5 below.

TABLE 5

| Intra mode | MipSizeId | | |
|---|---|---|---|
| | 0 | 1 | 2 |
| 0-66 | 5 | 0 | 6 |

For example, the encoding apparatus and the decoding apparatus according to an embodiment may map all normal intra prediction modes to MIP mode #5, 0 or 6 according to the size (MipSizeId) of the current block. Alternatively, the encoding apparatus and the decoding apparatus according to an embodiment may convert the normal intra prediction mode into an MIP mode using the simplified mapping table as shown in Table 6 below.

TABLE 6

| Intra mode | MipSizeId | | |
|---|---|---|---|
| | 0 | 1 | 2 |
| 0-66 | MIP mode having a most probable selection rate | MIP mode having a most probable selection rate | MIP mode having a most probable selection rate |

For example, the encoding apparatus and the decoding apparatus according to an embodiment may map all normal intra prediction modes to MIP mode having a most probable selection rate for each block size according to the size (MipSizeId) of the current block. The encoding apparatus and the decoding apparatus according to an embodiment can reduce algorithm complexity by using the simplified mapping table, but may perform more sophisticated mapping compared to the above-described mapping method of mapping all normal intra prediction modes to the MIP mode without comparing the sizes of the blocks, in comparison of the sizes of the blocks.

Method of Generating MPM List of MIP Mode

Figure 25:
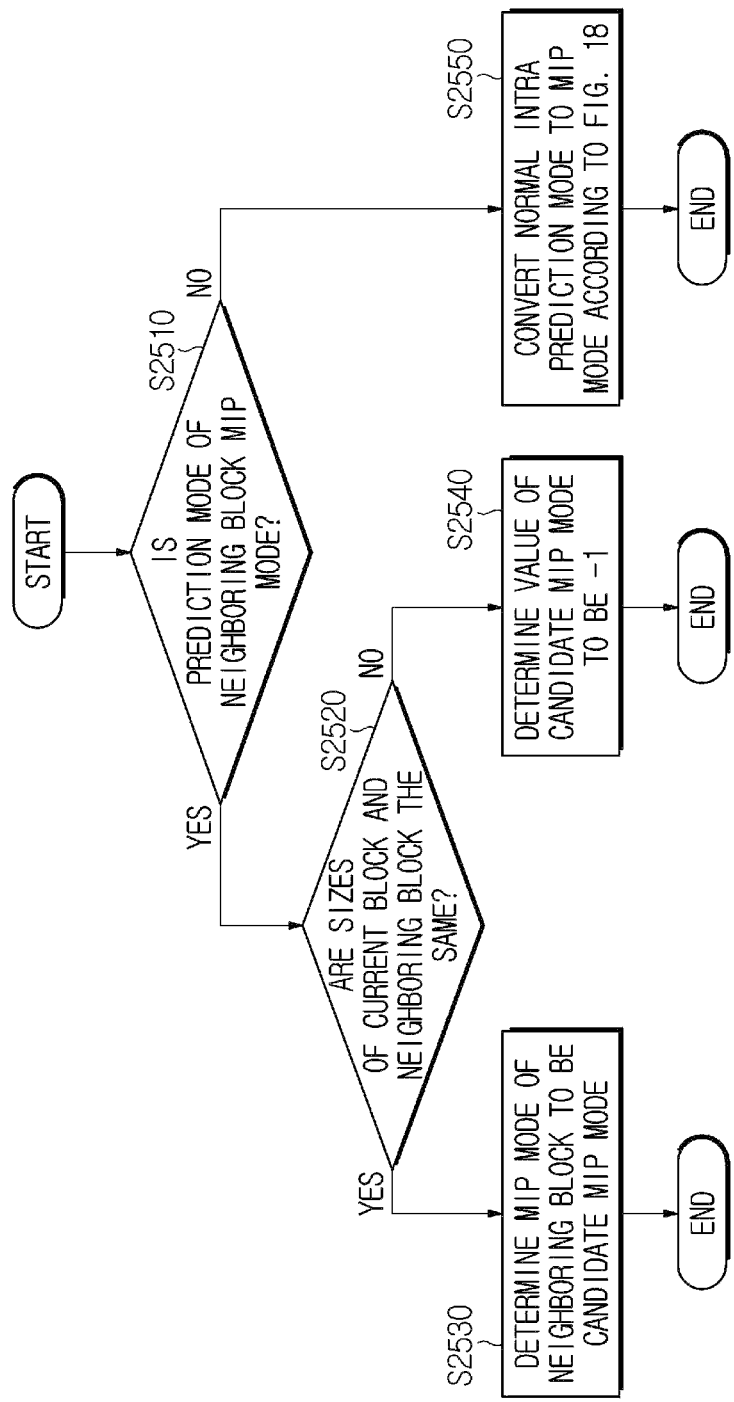
FIG. 25 is a flowchart illustrating a method of generating an MPM list using a mapping method according to another embodiment.

As described above, when the prediction mode of the current block is an MIP mode, the MIP mode of the neighboring block needs to be checked to generate the MPM list of the current block. FIG. 25 is a flowchart illustrating a candidate MIP mode determination method for configuring an MPM list of a current block according to an embodiment.

Referring to FIG. 25, in an embodiment, even if the prediction mode of the neighboring block is an MIP mode (S2510), when the number of MIP modes that the current block and the neighboring block may have is the same, that is, when the sizes of the current block and the neighboring block are the same (S2520), the encoding apparatus and the decoding apparatus may determine the MIP mode of the neighboring block to be a candidate MIP mode for configuring the MPM list of the current block (S2530). For example, even if the prediction mode of the neighboring block is an MIP mode (S2510), when the number of MIP modes that the current block and the neighboring block may have is not the same, that is, when the sizes of the current block and the neighboring block are not the same (S2520), the encoding apparatus and the decoding apparatus may determine the value of the candidate MIP mode for configuring the MPM list of the current block to be −1 (S2540). The value −1 of the candidate MIP mode may specify that the MIP mode value from the neighboring block cannot be used.

In addition, when the prediction mode of the neighboring block is not an MIP mode (S2510), the encoding apparatus and the decoding apparatus may convert the normal intra prediction mode into a candidate MIP mode according to FIG. 18 as described with reference to FIG. 18 (S2550).

As in the method of FIG. 25, the encoding apparatus and the decoding apparatus shall always check the sizes of the current block and the neighboring block in a process of referencing the neighboring block to determine the candidate MIP mode of the current block, and shall perform mapping as described with reference to FIG. 18 when the prediction mode of the neighboring block is not an MIP mode, thereby increasing computational complexity.

To reduce computational complexity, the encoding apparatus and the decoding apparatus according to an embodiment may check whether the neighboring block is in an MIP mode when the MPM list of the current bock encoded or decoded in the MIP mode is generated and determine a candidate MIP mode accordingly. For example, the encoding apparatus and the decoding apparatus may set the candidate MIP mode to Mode #0 when the encoding or decoding mode of the neighboring block is an MIP mode. Alternatively, the encoding apparatus and the decoding apparatus may set the value of the MIP mode to −1, when the encoding or decoding mode of the neighboring block is not an MIP mode. Therefore, since the encoding apparatus and the decoding apparatus need to only check whether MIP mode applies to the neighboring block, an algorithm for determining a candidate MIP mode may be more simplified and, when a neighboring block is in a normal intra prediction mode, a mapping procedure for converting it to an MIP mode may be skipped.

Meanwhile, the encoding apparatus and the decoding apparatus may determine a candidate MIP mode based on the sizes of the current block and the neighboring block to increase prediction accuracy. For example, when the current block is in an MIP mode, the neighboring block is referenced to generate the MPM list and the prediction mode of the neighboring block is an MIP mode, the encoding apparatus and the decoding apparatus may determine the candidate MIP mode to be mipMpmCand[sizeId] [0] with reference to Table 7 below. sizeId may mean the size of the neighboring block, sizeId 0 may mean a 4×4 luma block, sizeId 1 may mean a 4×8, 8×4 or 8×8 luma block, and sizeId 2 may mean a more than 8×8 luma block.

TABLE 7

| sizeId | mipMPMcand[sizeId][x] | | |
|---|---|---|---|
| | 0 | 1 | 2 |
| 0 | 17 | 34 | 5 |
| 1 | 0 | 7 | 16 |
| 2 | 1 | 4 | 6 |

For example, the encoding apparatus and the decoding apparatus may set the candidate MIP mode to #17 when the size of the neighboring block is 4×4, to #0 when the size of the neighboring block is 4×8, 8×4 or 8×8, to #1 in the other blocks. The encoding apparatus and the decoding apparatus may increase MPM mode accuracy by adaptively selecting a default candidate MIP mode according to the size of the neighboring block. Alternatively, in order to reduce computational complexity, the encoding apparatus and the decoding apparatus according to an embodiment may select a candidate MIP mode without considering the encoding mode of the neighboring block and generate an MPM list by using it without change. For example, when the MPM list for the MIP mode is generated, the encoding apparatus and the decoding apparatus may fixedly determine an MPM list (e.g., candMipModeList[ ]) for the MIP mode as follows without considering the encoding mode of the neighboring block. For example, when three MIP MPM lists are generated, x may have a value of 0 to 2 and thus candMipModeList[x] may be configured as follows with reference to Table 7. In this case, sizeId denotes the size of the neighboring block, but the encoding apparatus and the decoding apparatus may determine sizeId according to the size of the current block, in order to skip a process of referencing information on the neighboring block.

candMipModeList[0]=mipMpmCand[sizeId][0]

candMipModeList[1]=mipMpmCand[sizeId][1]

candMipModeList[2]=mipMpmCand[sizeId][2]

Figures 26, 27:
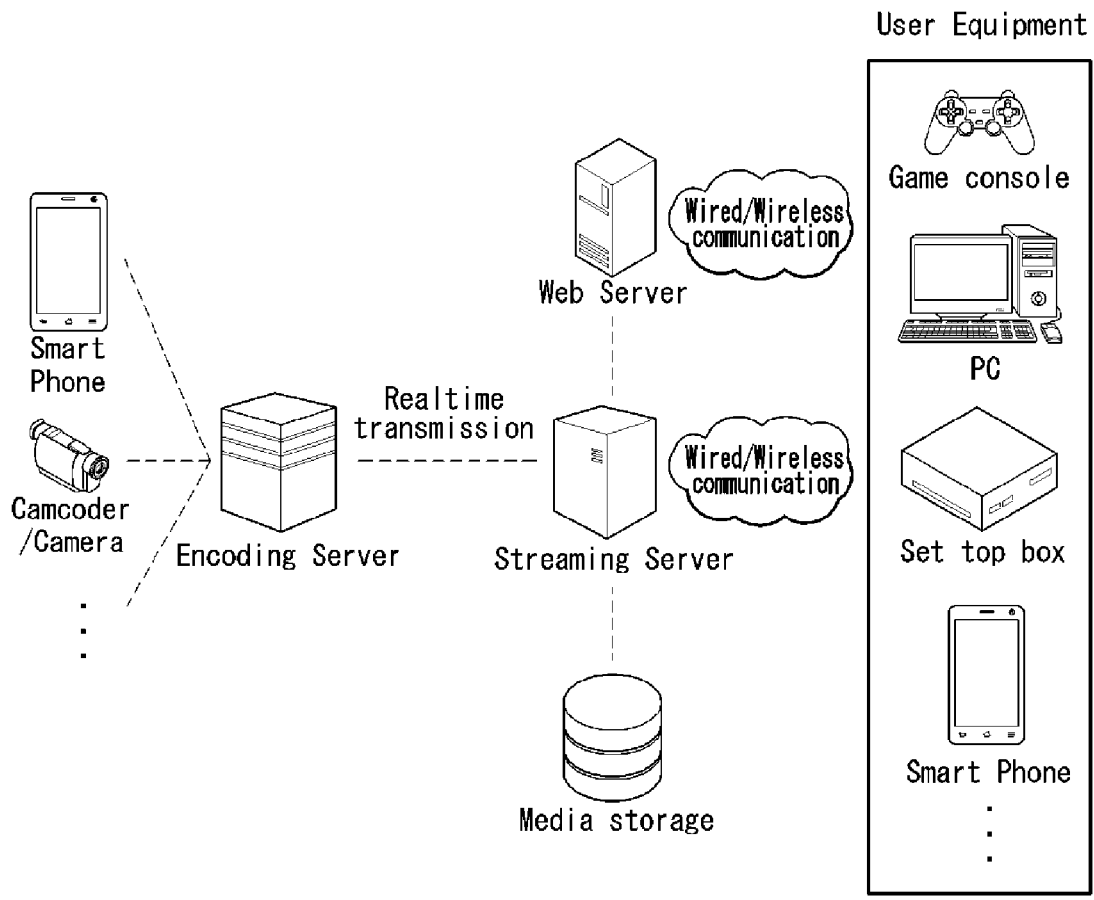
FIG. 26 is a flowchart illustrating coding performance data using a simplified mapping method according to another embodiment.
FIG. 27 is a view showing a content streaming system, to which an embodiment of the present disclosure is applicable.

FIG. 26 shows experimental data showing an encoding rate when encoding an image by fixedly determining an MPM list for an MIP mode as described above without considering an encoding mode of a neighboring block according to the above-described mapping method, compared to an encoding rate when encoding an image by generating an MPM list based on the candidate MIP mode determined according to the method of FIG. 25. As shown in FIG. 26, it can be seen that there is no difference in the encoding rate. That is, by applying the above methods, it is possible to reduce algorithm complexity while minimizing encoding loss and to reduce usage of the memory for the mapping table.

In another embodiment, when an MPM list for an MIP mode is generated, the encoding apparatus and the decoding apparatus may fixedly determine an MPM list (e.g., candMipModeList[ ]) for an MIP mode based on a mode selection probability as follows without considering the encoding mode of the neighboring block. For example, when three MIP MPM lists are generated, x may have a value of 0 to 2, and candMipModeList[x] may be configured as follows with respect to Table 8. In sortedmipMpmCand[sizeId][x], a candidate MIP mode may be stored for each block size based on an MIP mode selection probability. For example, a candidate MIP mode having a highest selection frequency in the corresponding sizeId may be stored in sortedmipMpmCand[sizeId][0], and a candidate MIP mode having a second highest selection frequency in the corresponding sizeId may be stored in sortedmipMpmCand[sizeId][1]. In this case, sizeId denotes the size of the neighboring block, but the encoding apparatus and the decoding apparatus may determine sizeId according to the size of the current block, in order to skip a process of referencing information on the neighboring block.

candMipModeList[0]=sortedmipMpmCand[sizeId][0]

candMipModeList[1]=sortedmipMpmCand[sizeId][1]

candMipModeList[2]=sortedmipMpmCand[sizeId][2]

TABLE 8

| sizeId | sortedmipMpmCand[sizeId][x] | | |
|---|---|---|---|
| | 0 | 1 | 2 |
| 0 | 5 | 17 | 22 |
| 1 | 0 | 12 | 3 |
| 2 | 6 | 1 | 8 |

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

FIG. 27 is a view showing a contents streaming system, to which an embodiment of the present disclosure is applicable.

As shown in FIG. 27, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
identifying a prediction mode of a current block;
identifying whether an intra prediction mode of the current block is an MIP (matrix-based intra prediction) mode, based on the prediction mode of the current block being the intra prediction mode;
determining a candidate intra prediction mode for the current block based on a prediction mode of a neighboring block located around the current block, based on the intra prediction mode of the current block not being the MIP mode;
generating a candidate intra prediction mode list of the current block based on the candidate intra prediction mode;
determining the intra prediction mode of the current block based on the candidate intra prediction mode list;
generating prediction samples of the current block based on the intra prediction mode of the current block; and
reconstructing the current block based on the prediction samples,
wherein the candidate intra prediction mode is determined to be a predetermined intra prediction mode, based on the prediction mode of the neighboring block being an MIP mode, wherein the candidate intra prediction mode is determined to be the predetermined intra prediction mode, based on the neighboring block not being available,
wherein the candidate intra prediction mode list is generated based on a first candidate intra prediction mode and a second candidate intra prediction mode,
wherein the first candidate intra prediction mode is determined based on a prediction mode of a first neighboring block located around the current block and the second candidate intra prediction mode is determined based on a prediction mode of a second neighboring block located around the current block, and
wherein the candidate intra prediction mode list is determined to have a predetermined candidate intra prediction mode, based on both the prediction mode of the first neighboring block and the prediction mode of the second neighboring block being an MIP mode.

2. The image decoding method of claim 1, wherein the predetermined intra prediction mode is a planar mode.

3. The image decoding method of claim 1,
wherein whether the prediction mode of the neighboring block is the MIP mode is determined based on an MIP mode indicator for the neighboring block, and
wherein the MIP mode indicator is obtained from a bitstream.

4. The image decoding method of claim 1, wherein, based on the first candidate intra prediction mode and the second candidate intra prediction mode being the same and the first candidate intra prediction mode being an intra prediction mode having a greater value than a prediction mode value specifying a DC mode, the candidate intra prediction mode list is determined to include the value of the first candidate intra prediction mode.

5. The image decoding method of claim 1, wherein the predetermined candidate intra prediction mode comprises at least one of a DC mode or a vertical mode.

6. The image decoding method of claim 1, wherein the determining the intra prediction mode of the current block based on the candidate intra prediction mode list is performed by determining any one of candidate intra prediction modes included in the candidate intra prediction mode list to be an intra prediction mode of the current block based on an intra prediction mode indicator obtained from a bitstream.

7. The image decoding method of claim 1, comprising:
determining a reference mode for determining an intra prediction mode of a chroma block corresponding to the current block; and
determining the intra prediction mode of the chroma block based on the reference mode,
wherein the current block is a luma block, and
wherein the reference mode is determined to be a planar mode based on the intra prediction mode of the current block being the MIP mode.

8. The image decoding method of claim 7, wherein the intra prediction mode of the chroma block is determined to be the reference mode.

9. The image decoding method of claim 8, wherein the reference mode is determined based on the intra prediction mode of the current block, based on the intra prediction mode of the current block not being the MIP mode.

10. An image encoding method performed by an image encoding apparatus, the image encoding method comprising:
identifying a prediction mode of a current block;
identifying whether an intra prediction mode of the current block is an MIP (matrix-based intra prediction) mode, based on the prediction mode of the current block being the intra prediction mode;
determining a candidate intra prediction mode based on a prediction mode of a neighboring block located around the current block, based on the intra prediction mode of the current block not being the MIP mode;
generating a candidate intra prediction mode list of the current block based on the candidate intra prediction mode;
encoding an intra prediction mode indicator specifying the intra prediction mode of the current block based on the candidate intra prediction mode list;
generating prediction samples of the current block based on the intra prediction mode of the current block; and
reconstructing the current block based on the prediction samples,
wherein the candidate intra prediction mode is determined to be a predetermined intra prediction mode, based on the prediction mode of the neighboring block being an MIP mode,
wherein the candidate intra prediction mode is determined to be the predetermined intra prediction mode, based on the neighboring block not being available,
wherein the candidate intra prediction mode list is generated based on a first candidate intra prediction mode and a second candidate intra prediction mode,
wherein the first candidate intra prediction mode is determined based on a prediction mode of a first neighboring block located around the current block and the second candidate intra prediction mode is determined based on a prediction mode of a second neighboring block located around the current block, and
wherein the candidate intra prediction mode list is determined to have a predetermined candidate intra prediction mode, based on both the prediction mode of the first neighboring block and the prediction mode of the second neighboring block being an MIP mode.

11. A method of transmitting a bitstream generated by an image encoding method, the image encoding method comprising:
identifying a prediction mode of a current block;
identifying whether an intra prediction mode of the current block is an MIP (matrix-based intra prediction) mode, based on the prediction mode of the current block being the intra prediction mode;
determining a candidate intra prediction mode based on a prediction mode of a neighboring block located around the current block, based on the intra prediction mode of the current block not being the MIP mode;
generating a candidate intra prediction mode list of the current block based on the candidate intra prediction mode;
encoding an intra prediction mode indicator specifying the intra prediction mode of the current block based on the candidate intra prediction mode list;
generating prediction samples of the current block based on the intra prediction mode of the current block; and
reconstructing the current block based on the prediction samples,
wherein the candidate intra prediction mode is determined to be a predetermined intra prediction mode, based on the prediction mode of the neighboring block being an MIP mode,
wherein the candidate intra prediction mode is determined to be the predetermined intra prediction mode, based on the neighboring block not being available wherein the candidate intra prediction mode list is generated based on a first candidate intra prediction mode and a second candidate intra prediction mode, wherein the first candidate intra prediction mode is determined based on a prediction mode of a first neighboring block located around the current block and the second candidate intra prediction mode is determined based on a prediction mode of a second neighboring block located around the current block, and wherein the candidate intra prediction mode list is determined to have a predetermined candidate intra prediction mode, based on both the prediction mode of the first neighboring block and the prediction mode of the second neighboring block being an MIP mode.

* * * * *